(12) United States Patent
Cloutier Boily et al.

(10) Patent No.: US 11,388,855 B2
(45) Date of Patent: Jul. 19, 2022

(54) METER ROLLER FOR AN AGRICULTURAL METERING SYSTEM

(71) Applicant: CNH Industrial Canada, Ltd., Saskatoon (CA)

(72) Inventors: Guillaume Cloutier Boily, Martensville (CA); Ethan Curtis Stephen Bent, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 321 days.

(21) Appl. No.: 16/549,114

(22) Filed: Aug. 23, 2019

(65) Prior Publication Data
US 2019/0373803 A1  Dec. 12, 2019

Related U.S. Application Data

(62) Division of application No. 15/454,982, filed on Mar. 9, 2017, now Pat. No. 10,405,485.

(51) Int. Cl.
*A01C 7/12* (2006.01)
*A01C 7/08* (2006.01)
(Continued)

(52) U.S. Cl.
CPC ............ *A01C 7/127* (2013.01); *A01C 7/042* (2013.01); *A01C 7/082* (2013.01); *A01C 19/02* (2013.01)

(58) Field of Classification Search
CPC ......... A01C 7/127; A01C 7/042; A01C 7/082; A01C 19/02; A01C 7/12; A01C 7/08;
(Continued)

(56) References Cited

U.S. PATENT DOCUMENTS 3,447,758 A   6/1969  Oznobichine
3,606,965 A   9/1971  Cortelou et al.
(Continued)

FOREIGN PATENT DOCUMENTS

AU   2007201262   4/2007
WO   WO2016135174  9/2016

OTHER PUBLICATIONS

1910 Tow-Behind Air Commodity Cart, Deere & Company, https://www.deere.com/en_US/products/equipment/planting_and_seeding_equipment/air_seeding/1910_commodity_air_cart/1910_commodity_air_cart.page, 2017, 3pgs.
(Continued)

*Primary Examiner* — Christopher J. Novosad
(74) *Attorney, Agent, or Firm* — Rebecca L. Henkel; Rickard K. DeMille

(57) ABSTRACT

A meter roller for an agricultural metering system includes a flute and a recess positioned adjacent to one another along a circumferential axis of the meter roller. The flute and the recess are configured to meter flowable particulate material from a storage tank to a material distribution system via rotation of the meter roller. In addition, a first circumferential extent of the flute is at least 1.5 times greater than a second circumferential extent of the recess along an entire longitudinal extent of the flute and the recess, and the entire longitudinal extent of the flute and the recess is greater than the first circumferential extent of the flute and the second circumferential extent of the recess.

16 Claims, 21 Drawing Sheets

(51) Int. Cl.
*A01C 7/04* (2006.01)
*A01C 19/02* (2006.01)

(58) Field of Classification Search
CPC .. A01C 7/00; A01C 7/04; A01C 7/081; A01C 19/00
See application file for complete search history.

(56) References Cited

U.S. PATENT DOCUMENTS

| | | |
|---|---|---|
| 3,954,204 A | 5/1976 | Becker |
| 3,982,670 A | 9/1976 | Brass |
| 4,023,511 A | 5/1977 | Newman |
| 4,053,088 A | 10/1977 | Grataloup |
| 4,254,897 A | 3/1981 | Stocks |
| 4,264,023 A | 4/1981 | Stocks et al. |
| 4,379,664 A | 4/1983 | Klein et al. |
| 4,453,866 A | 6/1984 | Ryan |
| 4,500,017 A | 2/1985 | Machnee |
| 4,537,333 A | 8/1985 | Bjerregaard |
| 4,600,122 A | 7/1986 | Lundie et al. |
| 4,896,616 A | 1/1990 | Wintersteiger et al. |
| 5,003,894 A | 4/1991 | Lafferty |
| 5,037,014 A | 8/1991 | Bliss |
| 5,170,909 A | 12/1992 | Lundie et al. |
| 5,314,090 A | 5/1994 | Alexander |
| 5,549,060 A | 8/1996 | Schick et al. |
| 5,601,209 A | 2/1997 | Barsi et al. |
| 5,826,523 A | 10/1998 | Gregor |
| 5,924,370 A | 7/1999 | Gregor et al. |
| 5,944,233 A | 8/1999 | Bourne |
| 5,996,515 A | 12/1999 | Gergor et al. |
| 6,158,630 A | 12/2000 | Mayerle et al. |
| 6,240,861 B1 | 6/2001 | Memory |
| 6,564,730 B2 | 5/2003 | Crabb et al. |
| 6,581,535 B2 | 6/2003 | Barry et al. |
| 6,598,548 B2 | 7/2003 | Lempriere |
| 7,083,069 B2 | 8/2006 | Wysong et al. |
| 7,100,522 B2 | 9/2006 | Mayerle |
| 7,380,733 B2 | 6/2008 | Owenby et al. |
| 7,428,874 B2 | 9/2008 | Jones et al. |
| 7,810,580 B2 | 10/2010 | Swanson |
| 7,849,806 B2 | 12/2010 | Wendte |
| 7,854,206 B2 | 12/2010 | Horsch |
| 8,166,895 B2 | 5/2012 | Dean et al. |
| 8,196,534 B2 | 6/2012 | Meyer et al. |
| 8,434,416 B2 | 5/2013 | Kowalchuk et al. |
| 8,511,242 B2 | 8/2013 | Applegate et al. |
| 8,617,630 B2 | 12/2013 | Swenson et al. |
| 8,671,857 B2 | 3/2014 | Kowalchuk et al. |
| 8,701,576 B2 | 4/2014 | Friggstad |
| 8,925,471 B2 | 1/2015 | Adams et al. |
| 8,985,396 B2 | 3/2015 | Jersey et al. |
| 9,144,190 B2 | 9/2015 | Herry et al. |
| 9,254,052 B2 | 2/2016 | Villarreal |
| 9,265,188 B2 | 2/2016 | Thompson et al. |
| 9,392,741 B2 | 7/2016 | Kowalcnuk et al. |
| 9,420,738 B2 | 8/2016 | Walter |
| 9,516,805 B2 | 12/2016 | Henry et al. |
| D815,156 S | 4/2018 | Cloutier Boily |
| D815,157 S | 4/2018 | Cloutier Boily |
| D816,726 S | 5/2018 | Cloutier Boily et al. |
| 10,085,376 B1 | 10/2018 | Cloutier Boily et al. |
| 10,149,429 B2 | 12/2018 | Cloutier Boily et al. |
| 10,197,427 B2 | 2/2019 | Henry |
| 10,292,324 B2 | 5/2019 | Cloutier Boily |
| 10,362,727 B2 | 7/2019 | Cloutier Boily |
| 10,405,485 B2 * | 9/2019 | Cloutier Boily ....... A01C 7/082 |
| 2012/0031315 A1 | 2/2012 | Beaujot |
| 2012/0325131 A1 | 12/2012 | Thompson et al. |
| 2015/0163990 A1 | 6/2015 | Audigie et al. |
| 2016/0120111 A1 | 5/2016 | Gervais et al. |
| 2016/0120113 A1 | 5/2016 | Kowalchuk et al. |
| 2018/0263178 A1 | 9/2018 | Cloutier Boily |

OTHER PUBLICATIONS

Case IH Announces Revolutionary, New 2000 Series Early Riser ® Planter, Nov. 23, 2015, 4 pgs.
Abati Titanium, Abati Agriculture Machinery, https://www.caseih.com/apac/en-int/products/planting-seeding/precision-air-carts, accessed Feb. 14, 2017, 5pgs.
How to Change Meter Rollers, John Deere, OMA85532: 1910 Commodity Air Cart, http://manuals.deere.com/omview/OMA85532_19/OUO6076_0000203_19_08JUN07_1.htm, Jun. 8, 2007, 6 pgs.
Chapter 6 Seeders for 2 and 4-Wheel Tractors, tcp/cpr/2907-3101; chap6a, http://www.fao.org/Ag/agp/agpc/doc/tibetmanual/06A.2_rotary_seeddrill.htm, last visited Feb. 9, 2017, 10 pgs.
"Air-Seeding Equipment," John Deere, 2015, 40 pgs (see, e.g., pp. 13, 31).
U.S. Appl. No. 16/549,745, filed Aug. 23, 2019, Cloutier Boily.
Accurate Seed Metering Capability, John Deere Sales Manual, May 26, 2011, 2 pgs, http://salesmanual.deere.com/sales/salesmanual/en_NA/seeding/2012/feature/metering/1990ccs/1990ccs_accurate_ccs_seedmetering_capability.html.

* cited by examiner

METER ROLLER FOR AN AGRICULTURAL METERING SYSTEM

CROSS-REFERENCE TO RELATED APPLICATION

The present application is a divisional of U.S. patent application Ser. No. 15/454,982, entitled "METER ROLLER FOR AN AGRICULTURAL METERING SYSTEM", filed Mar. 9, 2017, which is hereby incorporated by reference in its entirety.

BACKGROUND

The disclosure relates generally to a meter roller for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

BRIEF DESCRIPTION

In one embodiment, a meter roller for an agricultural metering system includes a flute and a recess positioned adjacent to one another along a circumferential axis of the meter roller. The flute and the recess are configured to meter flowable particulate material from a storage tank to a material distribution system via rotation of the meter roller. In addition, a first circumferential extent of the flute is at least 1.5 times greater than a second circumferential extent of the recess along an entire longitudinal extent of the flute and the recess, and the entire longitudinal extent of the flute and the recess is greater than the first circumferential extent of the flute and the second circumferential extent of the recess.

In another embodiment, a meter roller for an agricultural metering system includes flutes and corresponding recesses. The flutes and the corresponding recesses are arranged in an alternating pattern along a circumferential axis of the meter roller, and the flutes and the corresponding recesses are configured to meter flowable particulate material from a storage tank to a material distribution system via rotation of the meter roller. In addition, a first circumferential extent of each flute is at least 1.5 times greater than a second circumferential extent of each recess along an entire longitudinal extent of the flute and the recess, and the entire longitudinal extent of the flute and the recess is greater than the first circumferential extent of the flute and the second circumferential extent of the recess.

In a further embodiment, a meter roller for an agricultural metering system includes a spindle configured to be driven in rotation and a profile insert non-rotatably coupled to the spindle. The profile insert has a flute and a recess positioned adjacent to one another along a circumferential axis of the profile insert, and the flute and the recess are configured to meter flowable particulate material from a storage tank to a material distribution system via rotation of the profile insert. In addition, a first circumferential extent of the flute is at least 1.5 times greater than a second circumferential extent of the recess along an entire longitudinal extent of the flute and the recess, and the entire longitudinal extent of the flute and the recess is greater than the first circumferential extent of the flute and the second circumferential extent of the recess.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
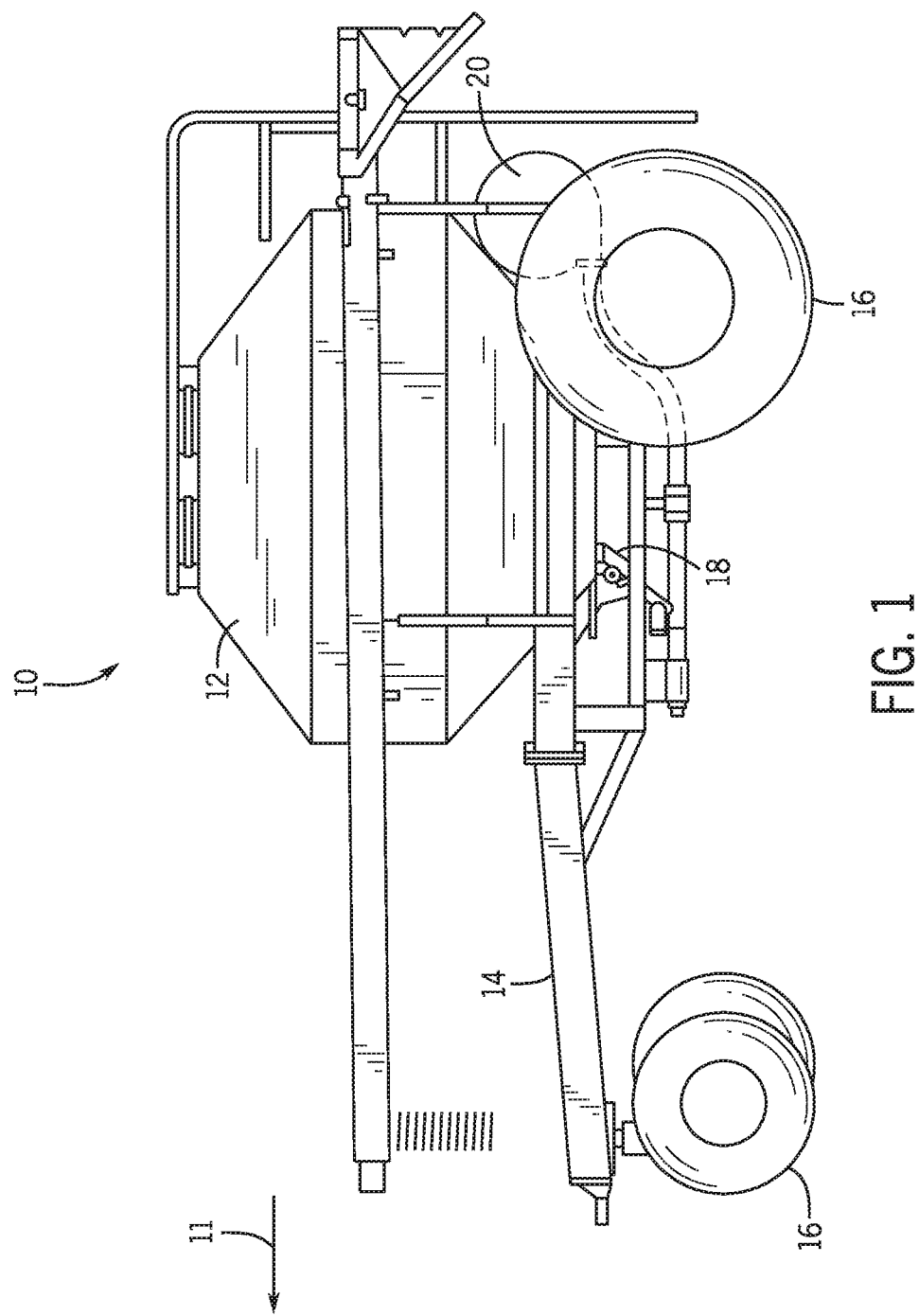
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11 (e.g., behind the implement or in front of the implement). In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
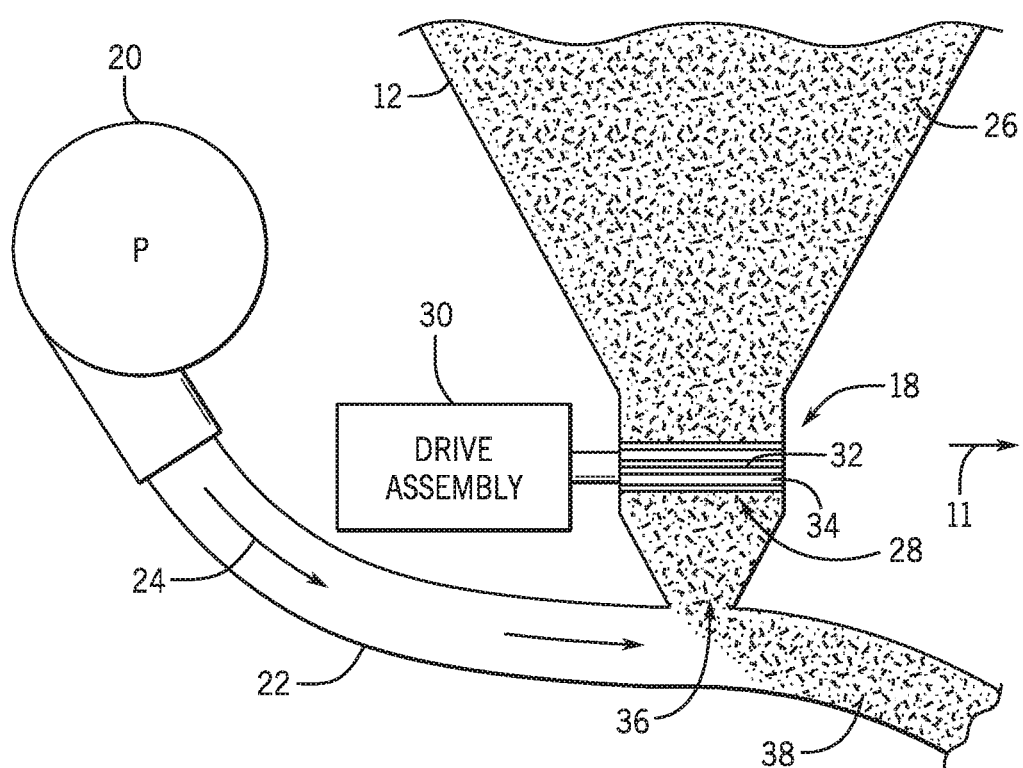
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 configured to regulate the flow of material 26 into the air flow 24. In certain embodiments, the metering system 18 may include multiple meter rollers 28 (e.g., housed within individual meter boxes) disposed adjacent to one another. In addition, certain metering systems 18 may include twelve meter rollers 28, each housed within an individual meter box and each configured to flow particulate material into a respective conduit 22 (e.g., of a material distribution system) for distribution to one or more respective row units of the agricultural implement. However, in alternative embodiments, the metering system 18 may include more or fewer meter rollers, e.g., 1, 2, 3, 4, 5, 6, 7, 8, 9, 10, 11, 13, or more. By independently adjusting the rotation speed of each meter roller, product flow to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the material 26 (e.g., agricultural product) disposed within the respective recess 34 downwardly, thereby transferring the material 26 to the conduit 22. The number and geometry of the flutes 32 are particularly configured to accommodate the material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 7, 8, 9, 10, 11, 12, 13, 14, 15, 16, 17, 18, 19, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 26. While the illustrated meter roller includes flutes, it should be appreciated that in alternative embodiments, the meter roller may include other protrusions, and/or the recesses may be omitted.

In the illustrated embodiment, the rotationally axis of the meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 28 controls the flow of material 26 into the air flow 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduit(s), where the seeds and/or fertilizer are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

Figure 3:
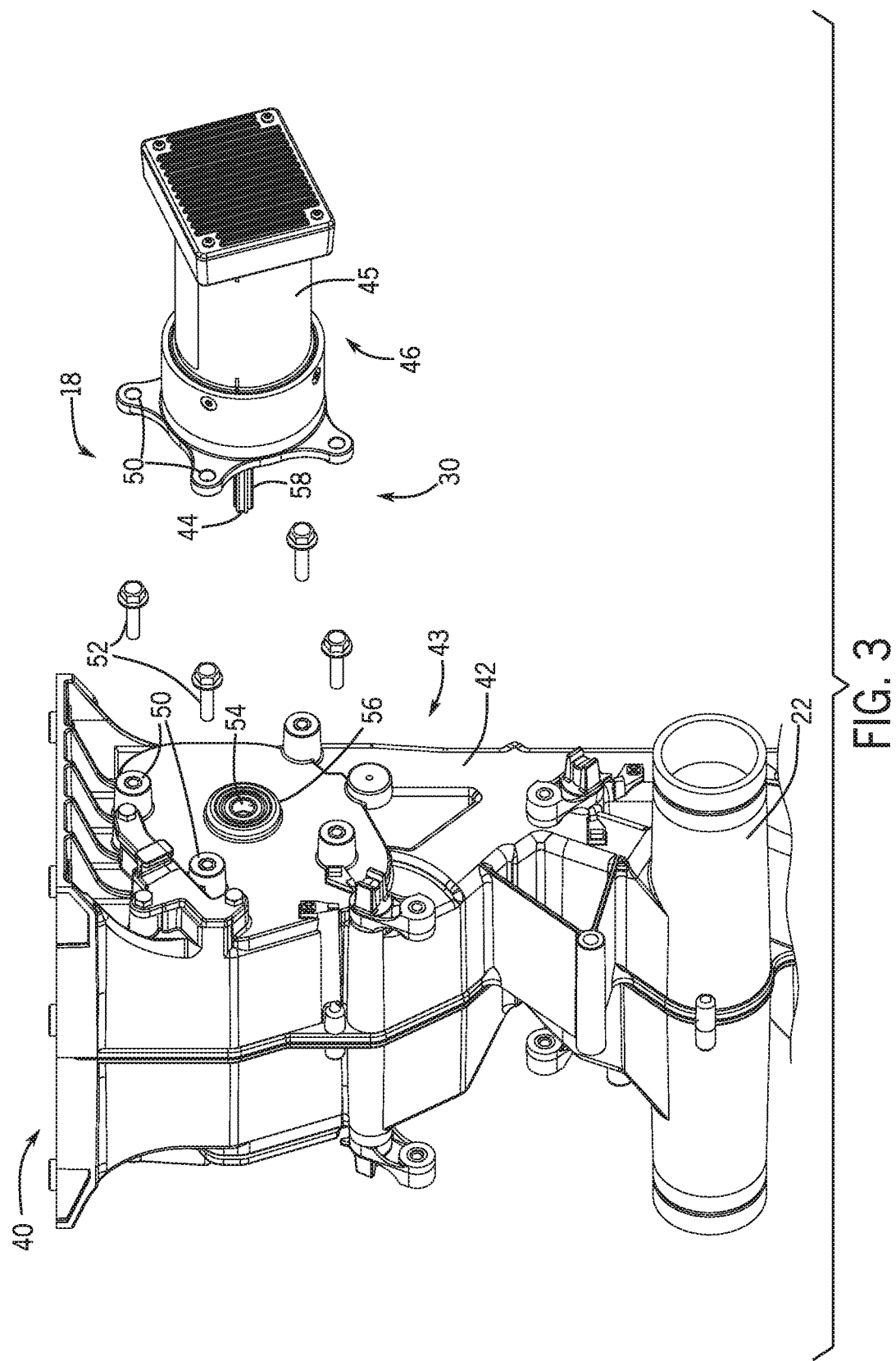
FIG. 3 is an exploded perspective view of an embodiment of a metering system that may be employed within the air cart of FIG. 1.

FIG. 3 is an exploded perspective view of an embodiment of a metering system 18 that may be employed within the air cart of FIG. 1. The metering system 18 includes a meter box 40 and a drive assembly 30. The meter box 40 has a passage 42 configured to direct the flowable particulate material to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor (e.g., electric motor) 45 that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the meter box 40. The drive shaft 44 is configured to drive the meter roller to rotate. A bearing (e.g., ball bearing) 56 facilitates rotation of the drive shaft 44 and meter roller within the meter box 40. As the conduit 22 transfers air under the passage 42, the motor (e.g., electric motor) of the drive unit 46 drives the drive shaft 44 to rotate the meter roller. As the meter roller rotates, the meter roller dispenses flowable particulate material via the passage 42 to the air flow within the conduit 22 to form the air/material mixture. Further, pressurized air from the tank may flow through the passage 42 with the material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, it should be appreciated that in alternative embodiments, the drive unit may include any other suitable system configured to drive rotation of the meter roller, such as a hydraulic motor, a pneumatic motor, or a gear assembly coupled to a wheel of the air cart.

Figure 4:
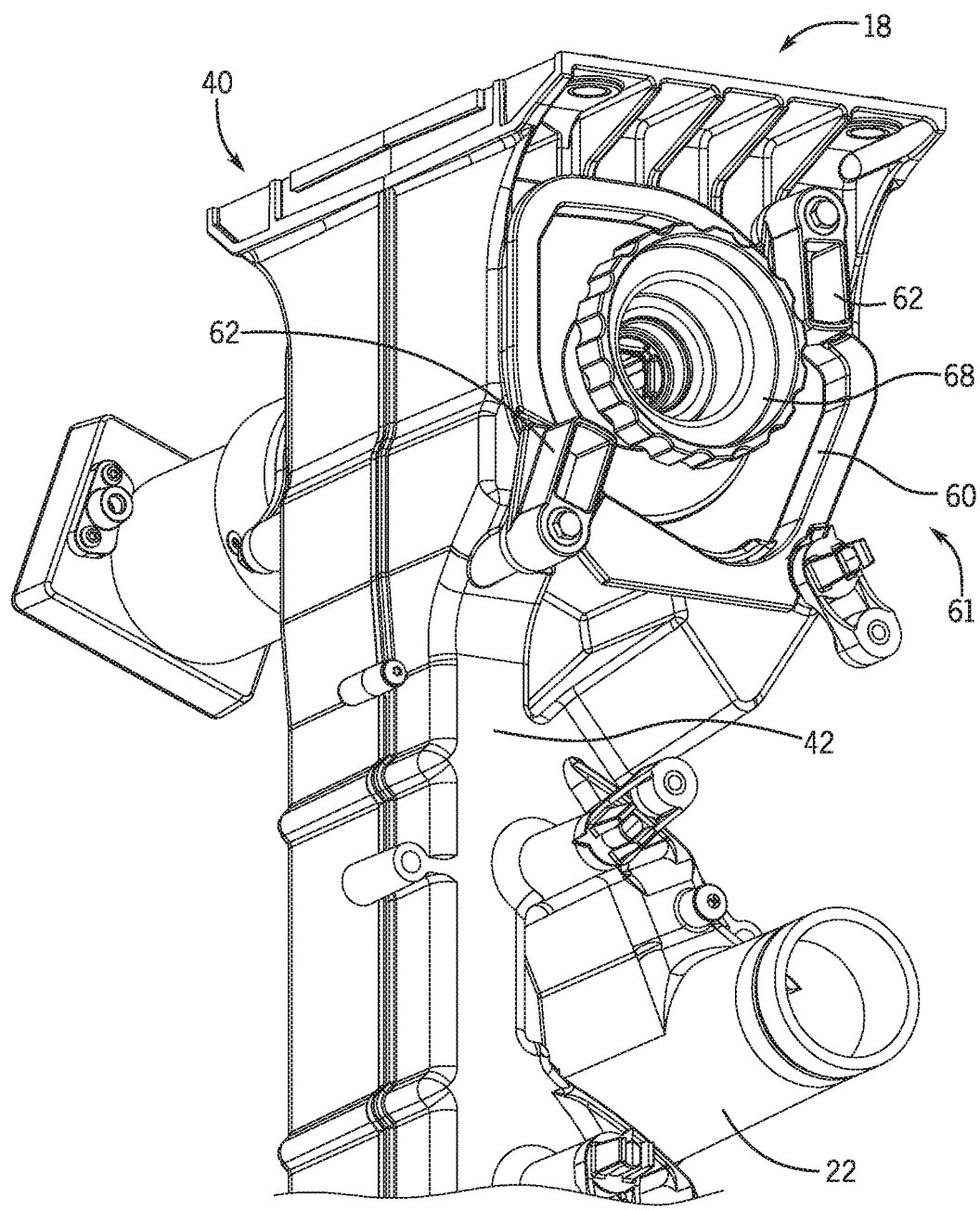
FIG. 4 is a perspective view of the metering system of FIG. 3, in which a cartridge is disposed within a meter box.

FIG. 4 is a perspective view of the metering system 18 of FIG. 3, in which a cartridge 60 is disposed within the meter box 40. As discussed in detail below, the cartridge 60 (e.g., modular meter roller cartridge) is configured to facilitate removal and installation of the meter roller via a meter box opening on a second side 61 (e.g., cartridge side) of the meter box 40. As illustrated, the meter box 40 houses the cartridge 60 while the cartridge is disposed within the opening. While the cartridge 60 is housed within the meter box 40 of the metering system 18 in the illustrated embodiment, it should be appreciated that in alternative embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. The cartridge 60 has a cross-sectional shape that substantially corresponds to the cross-sectional shape of the meter box opening. As illustrated, the meter box 40 includes two cartridge locking tabs 62 configured to selectively block removal of the cartridge 60 from the meter box 40, thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart). The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, it should be appreciated that in alternative embodiments, the cartridge locking tab may be part of a spring latch, a bolt latch, or any suitable type of locking mechanism. Furthermore, while the illustrated meter box includes two locking tabs, it should be appreciated that in alternative embodiments, the meter box may include more or fewer locking tabs (e.g., 1, 2, 3, 4, etc.). In the illustrated embodiment, the cartridge 60 includes a releasable bearing coupler 68. As discussed in detail below, the releasable bearing coupler 68 retains the meter roller within the cartridge, facilitates rotation of the meter roller within the cartridge, and facilitates removal of the meter roller from the cartridge.

Figure 5:
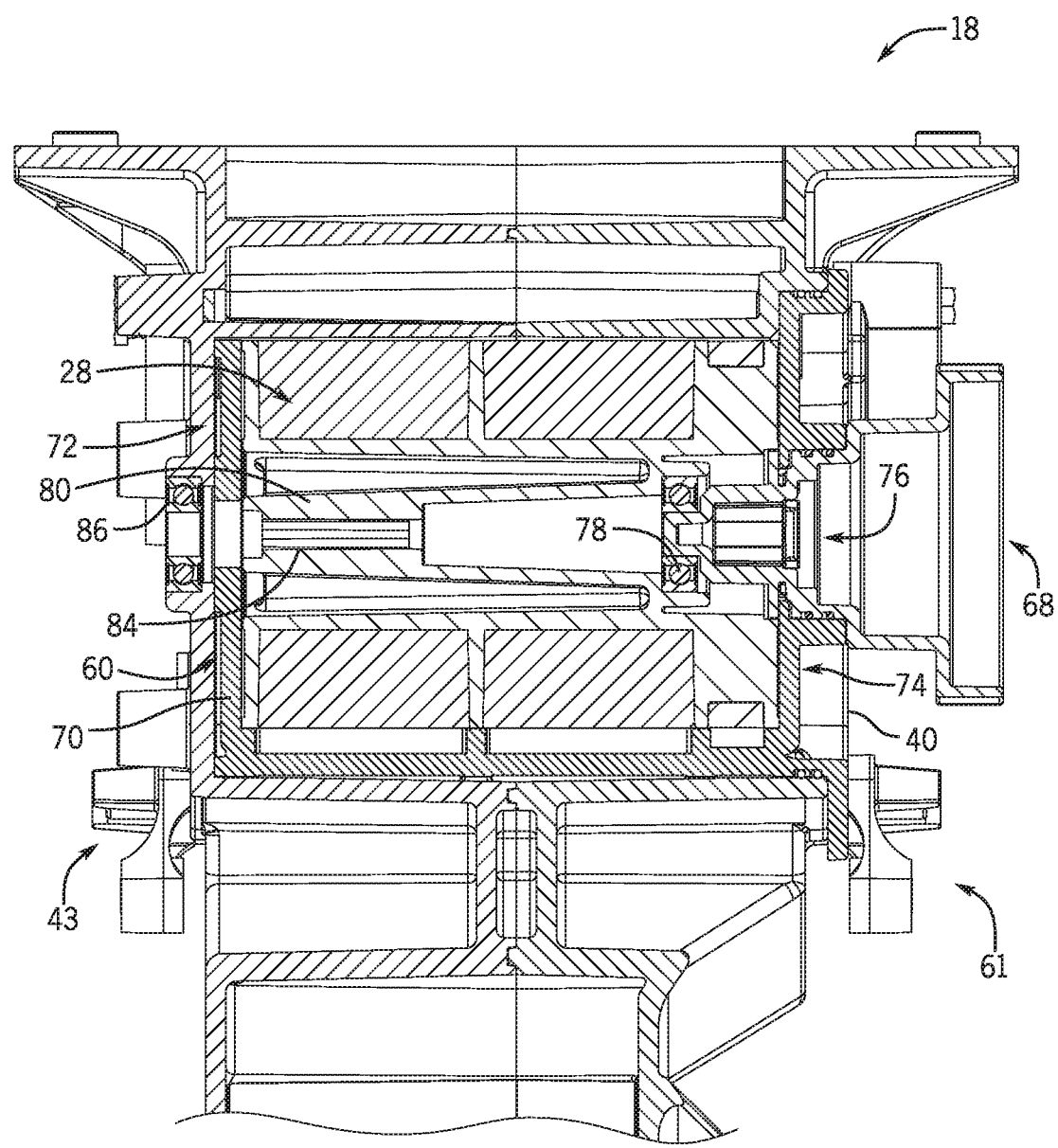
FIG. 5 is a cross-sectional view of the metering system of FIG. 3.

FIG. 5 is a cross-sectional view of the metering system 18 of FIG. 3. As illustrated, the cartridge 60 is engaged with/disposed within the meter box 40 of the metering system 18. The cartridge 60 includes a housing 70 configured to rotatably support the meter roller 28 within the meter box 40 (e.g., the housing 70 is secured to the meter box while the meter roller 28 rotates). The housing 70 includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the meter roller 28. The meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. The driven shaft may be an integral part of a meter roller spindle, and the flutes and recesses of the meter roller may be formed on one or more meter roller inserts non-rotatably coupled to the spindle. While the second engagement feature includes recesses in the illustrated embodiment, it should be appreciated that in alternative embodiments, the second engagement feature may include a cavity having a polygonal cross-section and configured to engage the drive shaft having a corresponding polygonal cross-section (e.g., first engagement feature). Furthermore, while the illustrated second engagement feature 84 facilities shape-based engagement with the first engagement feature, it should be appreciated that in alternative embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft 80, the drive shaft, and the meter roller bearing 78 associated with the releasable bearing coupler 68 are in longitudinal alignment, thereby facilitating rotation of the meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box 40, the housing 70 rotatably supports/houses the meter roller 28. To change a meter roller 28, the operator may remove the cartridge 60, replace the meter roller 28, and then reinstall the cartridge 60. Alternatively, the operator may remove the cartridge 60 and replace the cartridge with another cartridge that contains a different meter roller or with a different cartridge type.

Figure 6:
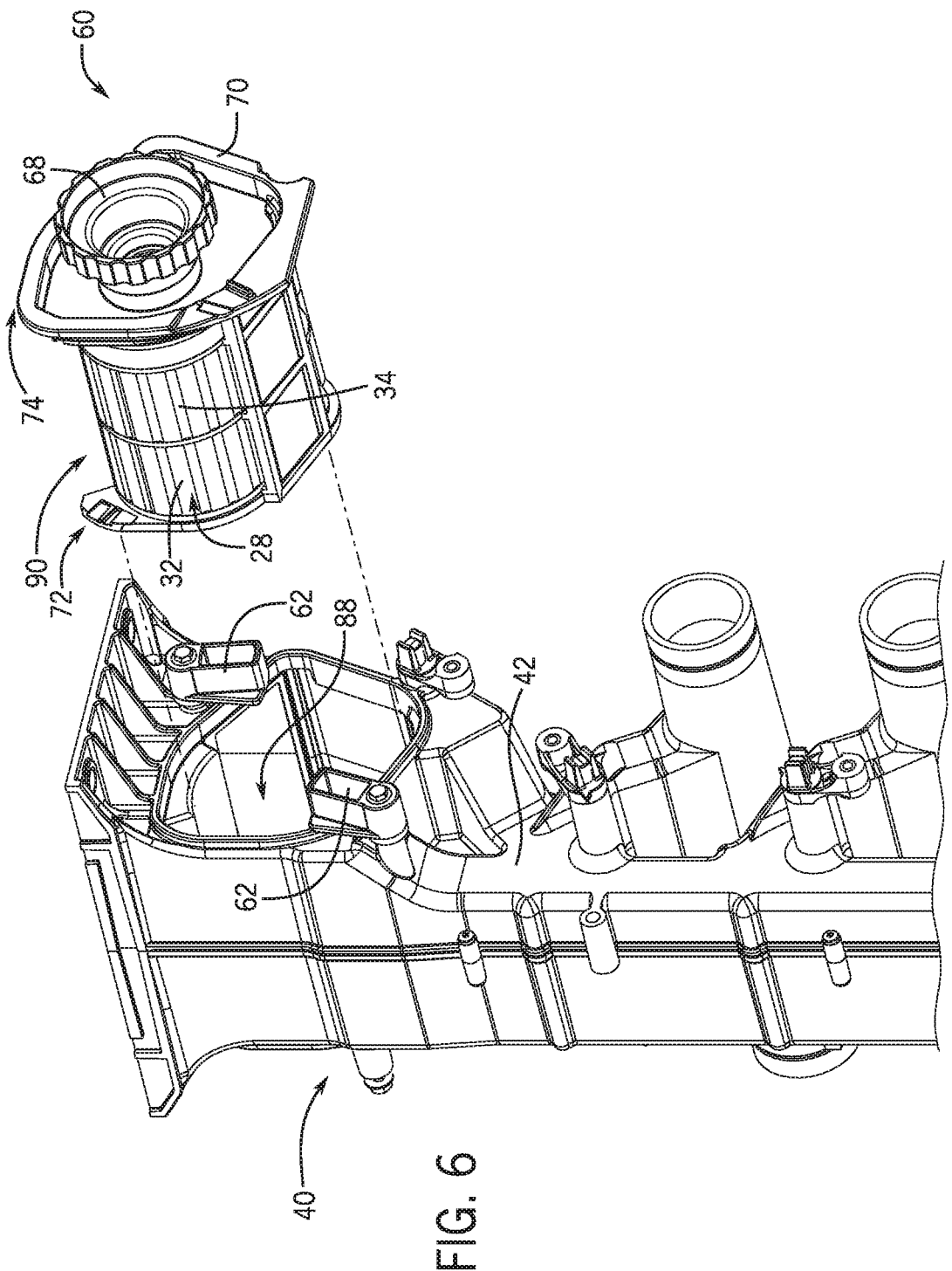
FIG. 6 is a perspective view of the metering system of FIG. 3, in which the cartridge is removed from the meter box.

FIG. 6 is a perspective view of the metering system of FIG. 3, in which the cartridge 60 is removed from the meter box 40. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially correspond to the cross-sectional shape of the meter box opening 88.

As illustrated, the meter roller 28 includes flutes 32 and recesses 34, which are configured to enable the meter roller 28 to control the flow of the flowable particulate material into the passage 42. The meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/housing. Once the rotatable bearing coupler 68 is removed, the meter roller 28 may be removed through an opening 90, thereby enabling insertion of another meter roller (e.g., suitable for use with material having a larger or small particle size, and/or for a higher or lower target application rate).

Figure 7:
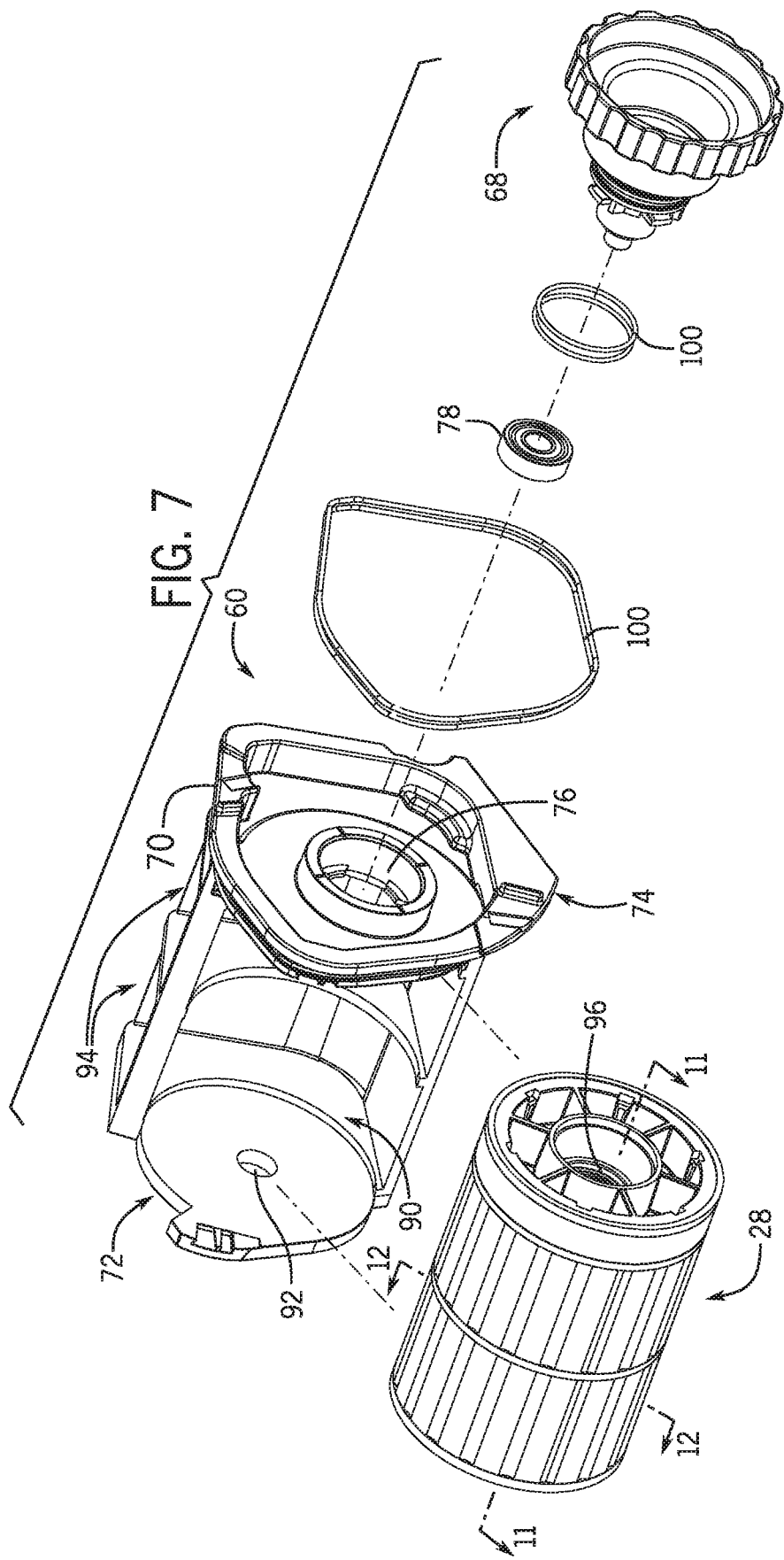
FIG. 7 is an exploded perspective view of the cartridge of FIG. 4, in which a meter roller is removed from a housing of the cartridge.

FIG. 7 is an exploded perspective view of the cartridge 60 of FIG. 4, in which the meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the meter roller 28 to receive the material.

To couple the meter roller 28 to the housing 70, the meter roller 28 is disposed within the housing 70 through the meter roller opening 90. While the meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the meter roller 28. The bearing opening 96 may be configured to receive the bearing 78 or the bearing may be fixedly mounted within the opening 96. The openings of the meter roller 28 and cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, it should be appreciated that in alternative embodiments, any suitable number of gaskets (e.g., O-rings) may be used to seal adjacent parts. Once the meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the meter roller 28 to facilitate rotation of the meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the meter roller 28 and secures the meter roller to the housing 70.

Figure 8:
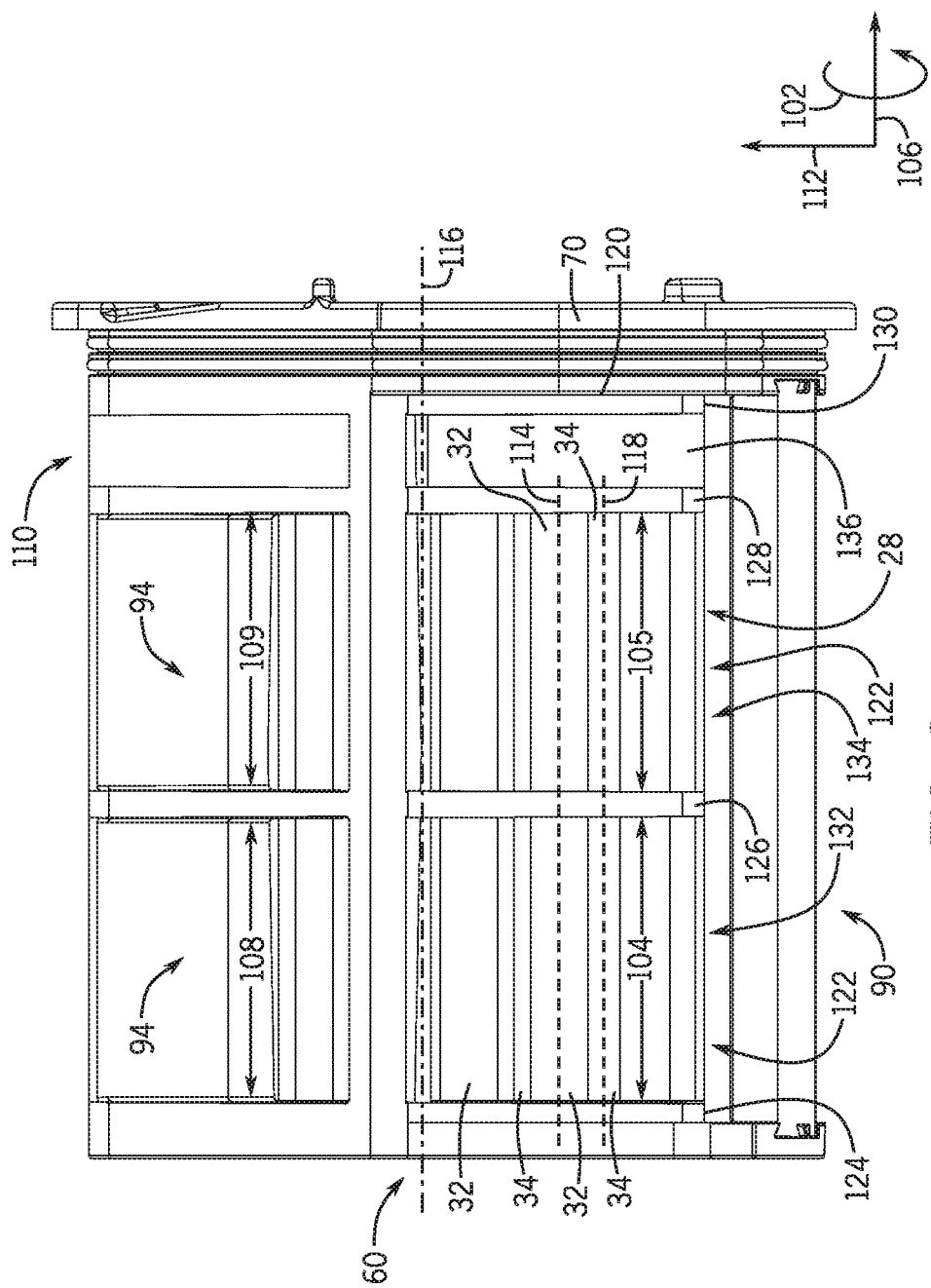
FIG. 8 is a top view of the cartridge of FIG. 4.

FIG. 8 is a top view of the cartridge 60 of FIG. 4. In the illustrated embodiment, the meter roller 28 within the cartridge 60 is configured to meter flowable particulate material having fine particles at a low rate. Accordingly, the aggregate volume of the recesses may be less than a meter roller configured to meter larger particles at a faster rate. In the illustrated embodiment, the circumferential extent of each flute 32 (e.g., extent of each flute 32 along a circumferential axis 102) is at least 1.5 times greater than the circumferential extent of each recess 34 (e.g., extent of each recess 34 along the circumferential axis 102) along an entire longitudinal extent 104 or 105 of the flute 32 and the recess 34 (e.g., the entire extent 104 of the flute 32 and the recess 34 of a first rank 132 along a longitudinal axis 106, and an entire extent 105 of the flutes 32 and the recesses 34 of a second rank 134 along the longitudinal axis 106). Furthermore, the entire longitudinal extent 104 or 105 of each flute 32 and each recess 34 is greater than the circumferential extent of the flute and the circumferential extent of the recess.

In the illustrated embodiment, the longitudinal extent 104 of the flutes 32 and recesses 34 of the first rank 132 is substantially equal to a width 108 of a respective material receiving opening 94 (e.g., extent of the material receiving opening 94 along the longitudinal axis 106). In addition, the longitudinal extent 105 of the flutes 32 and recesses 34 of the second rank 134 is substantially equal to a width 109 of a respective material receiving opening 94 (e.g., extent of the material receiving opening 94 along the longitudinal axis 106). For example, the flute/recess longitudinal extent 104, 105 and the opening width 108, 109 may be between about 20 and about 75 mm, about 30 and about 50 mm, about 47.5 mm, or about 32.5 mm. As previously discussed, the flowable particulate material flows through the material receiving openings 94 to the meter roller 28. The width 108, 109 of the material receiving openings substantially reduces or eliminates the possibility of the openings becoming blocked due to clumping of the flowable agricultural product (e.g., as compared to a narrower opening, such as the auxiliary opening 110, which is currently blocked). However, the wider openings enable more flowable particulate material to flow to the meter roller. Accordingly, the illustrated meter roller 28 includes recesses 34 that have a small aggregate volume to establish a low flow rate for a particular meter roller rotation speed. For example, as previously discussed, the recesses are circumferentially spaced apart from one another by more than 1.5 times the circumferential extent of the recesses. In addition, the depth of each recess (e.g., extent of the recess along a radial axis 112) is shallow to reduce the aggregate volume of the recesses. As a result of the meter roller configuration, the meter roller may provide flowable particulate material to the distribution system at a low flow rate while substantially reducing or eliminating the possibility of blocking the material receiving openings with clumped material.

Meter rollers may be characterized by a ratio of aggregate recess volume to width of the material receiving opening. In the illustrated embodiment, each recess 34 of the first rank 132 has a volume of about 183 mm$^3$, and each rank (e.g., the first rank 132 and the second rank 134) has nine recesses. Accordingly, the aggregate recess volume for the first rank 132 is about 1643 mm$^3$. As previously discussed, the width 108 of the respective material receiving opening 94 (e.g., the opening 94 configured to provide flowable particulate material to the first rank 132) is about 47.5 mm. Accordingly, the ratio of aggregate recess volume to opening width for the first rank 132 is about 34. However, it should be appreciated that in certain embodiments, the ratio may be higher or lower (e.g., depending on the number of recesses and the volume of each recess). For example, to establish a low flow rate of fine particulate material while substantially reducing or eliminating the possibility of blocking the material receiving openings, the ratio may be less than about 50, less than about 45, less than about 40, less than about 35, or less than about 30. Utilizing such a meter roller profile may enable the motor of the drive unit to rotate the meter roller at a speed sufficient to facilitate precise control of the meter roller rotation rate (e.g., as compared to rotating a meter roller having a larger aggregate recess volume slower than a minimum controllable speed of the motor).

In the illustrated embodiment, the longitudinal axis 114 of each flute 32 is substantially parallel to the rotational axis 116 of the meter roller 28. In addition, the longitudinal axis 118 of each recess 34 is substantially parallel to the rotational axis 116 of the meter roller 28. However, as discussed in detail below, in alternative embodiments, the longitudinal axis of each flute and the longitudinal axis of each recess may be oriented at an angle (e.g., of at least 2 degrees) relative to the rotational axis of the meter roller. Furthermore, in certain embodiments, the flutes and recesses may follow a curved path from one longitudinal side of a rank to the other longitudinal side of the rank.

In the illustrated embodiment, the meter roller 28 is formed from a spindle 120 and profile inserts 122. As discussed in detail below, the profile inserts, which form the flutes and recesses of the meter roller, are arranged in ranks, and the profile inserts of each rank are coupled to one another and non-rotatably coupled to the spindle. Accordingly, as the drive shaft drives the spindle 120, which includes the driven shaft, to rotate, the profile inserts 122 are driven to rotate, thereby inducing the flutes and the recesses to meter the flowable particulate material to the distribution system. In the illustrated embodiment, the spindle 120 includes a first ring 124, a second ring 126, a third ring 128, and a fourth ring 130. Each ring is rigidly and non-rotatably coupled to (e.g., integrally formed with) the driven shaft. A first rank 132 of profile inserts 122 is longitudinally disposed between the first ring 124 and the second ring 126, and a second rank 134 of profile inserts 122 is longitudinal disposed between the second ring 126 and the third ring 128. In addition, a sealing ring 136 is longitudinally disposed between the third ring 128 and the fourth ring 130. As discussed in detail below, the sealing ring 136 is configured to block the flowable particulate material from entering an interior of the spindle 120.

Figure 9:
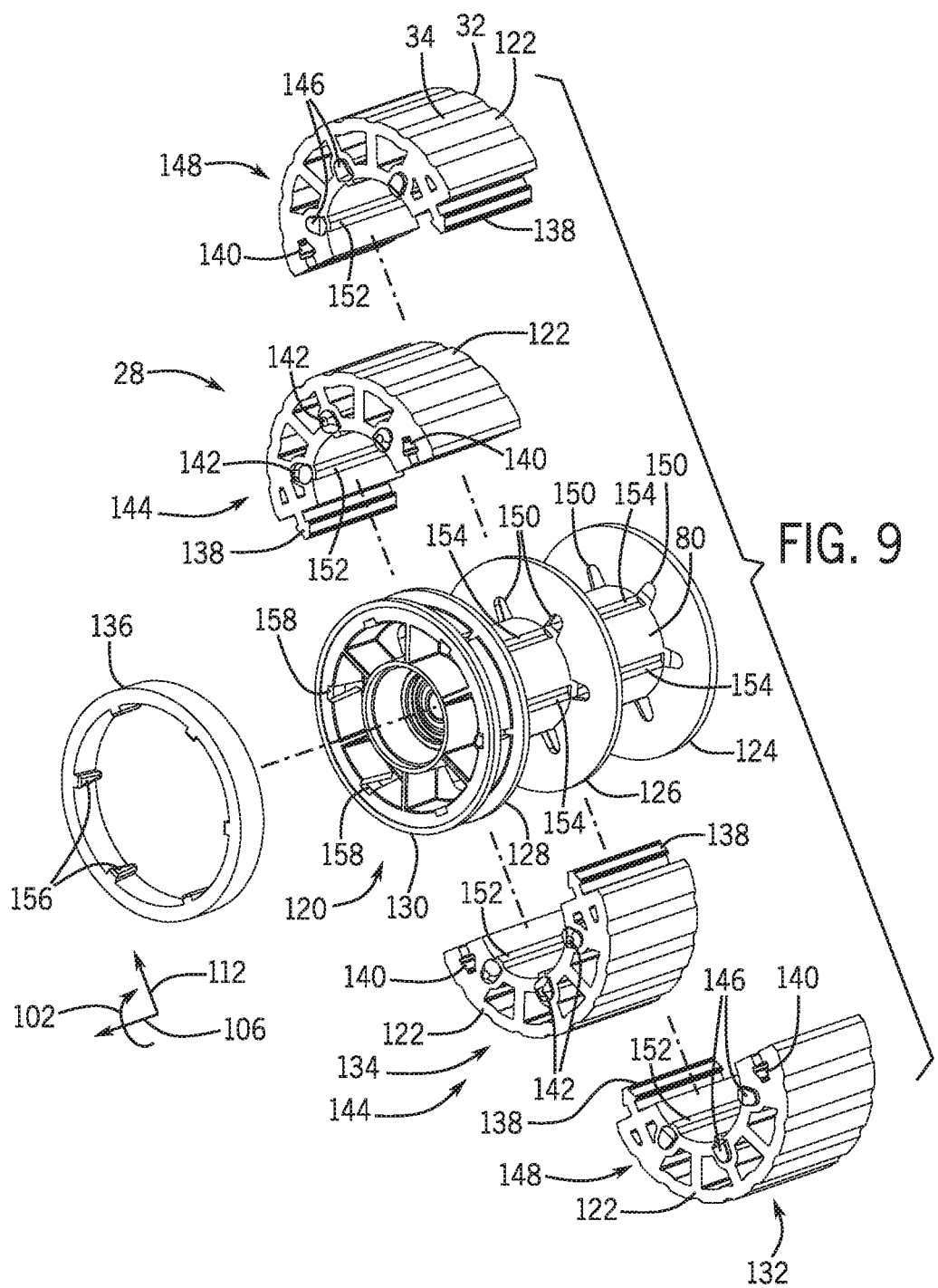
FIG. 9 is an exploded back perspective view of the meter roller of FIG. 7, in which profile inserts and a sealing ring are removed from a spindle.

FIG. 9 is an exploded back perspective view of the meter roller 28 of FIG. 7, in which the profile inserts 122 and the sealing ring 136 are removed from the spindle 120. In the illustrated embodiment, the first rank 132 is formed by two profile inserts 122, and the second rank 134 is formed by two profile inserts 122. Accordingly, each profile insert 122 extends about only a portion of the circumference of the spindle 120. As previously discussed, the profile inserts of each rank are configured to couple to one another and to non-rotatably couple to the spindle. In the illustrated embodiment, each profile insert 122 includes a first coupling element, such as the illustrated protrusion 138, and a second coupling element, such as the illustrated recess 140. For each rank, the protrusion 138 of each profile insert 122 is configured to engage a corresponding recess 140 of the other profile insert 122. Engagement of the protrusions and the recesses couples the profile inserts to one another while the profile inserts are disposed on the spindle. While the first coupling element is a protrusion and the second coupling element is a recess in the illustrated embodiment, it should be appreciated that in alternative embodiments, the coupling elements may be other structures (e.g., magnet(s), hook and loop fastener(s), etc.) configured to engage one another to couple the profile inserts to one another, or the profile inserts may be coupled to one another by an adhesive connection or a welded connection, for example. Furthermore, in certain embodiments, the profile inserts of each rank may be coupled to one another by multiple connection systems. For example, the profile inserts of each rank may be coupled to one another by the illustrated protrusion/recess connection and by an adhesive connection. Furthermore, while each rank includes two profile inserts in the illustrated embodiment, it should be appreciated that in alternative embodiments, each rank may be formed from more or fewer profile inserts (e.g., 1, 2, 3, 4, 5, 6, or more) coupled to one another to form an annular structure around the spindle.

In the illustrated embodiment, each profile insert 122 includes three profiled longitudinal extensions 142 (e.g., first longitudinal extensions, locking elements) on a longitudinally outward side 144 (e.g., first longitudinal side) of the profile insert 122. In addition, each profile insert 122 includes three substantially flat longitudinal extensions 146

(e.g., second longitudinal extensions, locking elements) on a longitudinally inward side 148 (e.g., second longitudinal side) of the profile insert 122. The profiled longitudinal extensions on the profile inserts 122 of the first rank 132 are configured to engage openings 150 in the first ring 124, and the profiled longitudinal extensions 142 on the profile inserts 122 of the second rank 134 are configured to engage openings in the third ring 128. In addition, the substantially flat longitudinal extensions 146 on the profile inserts 122 of the first rank 132 are configured to engage openings 150 in the second ring 126, and the substantially flat longitudinal extensions on the profile inserts 122 of the second rank 134 are configured to engage the openings 150 in the second ring 126. Engagement of the longitudinal extensions 142 and 146 with the corresponding openings 150 substantially blocks rotation of the profile inserts 122 relative to the spindle 120. While each profile insert includes three profiled longitudinal extensions and three substantially flat longitudinal extensions in the illustrated embodiment, it should be appreciated that in alternative embodiments, each profile insert may include more or fewer profiled longitudinal extensions (e.g., 1, 2, 3, 4, 5, 6, or more) and/or substantially flat longitudinal extensions (e.g., 1, 2, 3, 4, 5, 6, or more).

To couple each profile insert to the spindle, a first profile insert of each rank may be translated in a radially inward direction toward the spindle. The first profile extension may then be tilted such that the substantially flat longitudinal extensions contact the second ring while the profiled longitudinal extensions are positioned radially outward from the first/third ring. The longitudinally outward side of the first profile insert may be rotated toward the spindle such that the profiled longitudinal extensions engage the first/third ring. As rotation of the first profile insert continues, contact between a tapered surface of each profiled longitudinal extension and the first/third ring deforms the ring and/or compresses the first profile insert (e.g., the profiled longitudinal extensions of the first profile insert), thereby enabling the first profile insert to move radially inward. Alternatively, the first profile insert may be compressed with a tool (e.g., clamp) to facilitate radially inward movement of the first profile insert. The first profile insert may then be translated radially inward until the profiled longitudinal extensions and the substantially flat longitudinal extensions engage the respective openings in the rings. The second profile insert may be inserted in the same manner as the first profile insert. When the second profile insert is fully inserted, the protrusions of the profile inserts engage the recesses of the profile inserts, thereby coupling the profile inserts to one another. In addition, contact between the longitudinal extensions and the openings in the rings substantially blocks rotation of the profile inserts relative to the spindle.

In the illustrated embodiment, each profile insert 122 includes three locking elements, such as the illustrated protrusions 152 extending inwardly along the radial axis 112, and the driven shaft 80 of the spindle 120 includes corresponding locking elements, such as the illustrated recesses 154 extending inwardly along the radial axis 112. Engagement of the protrusions 152 with the recesses 154 substantially blocks rotation of the profile inserts relative to the spindle. While each profile insert includes three protrusions in the illustrated embodiment, it should be appreciated that in alternative embodiments, each profile insert may include more or fewer protrusions (e.g., 1, 2, 3, 4, 5, 6, or more), and the driven shaft may include a corresponding number of recesses. As discussed in detail below, the recesses may be particularly shaped to facilitate manufacturing of the spindle, and the protrusions may have respective corresponding shapes. Alternatively, the protrusions may be substantially the same shape as one another, and the corresponding recesses may be substantially the same shape as one another.

While the illustrated profile inserts 122 include longitudinal extensions 142 and 146, and the rings of the spindle 120 include openings 150, it should be appreciated that in alternative embodiments, one or more profile inserts may include one or more openings and/or recesses, and the ring(s) of the spindle may include one or more corresponding longitudinal extensions configured to engage the opening(s)/recess(es) of the profile insert(s) to substantially block rotation of the profile inserts relative to the spindle. In addition, while the illustrated profile inserts 122 include protrusions 152, and the driven shaft 80 of the spindle 120 includes recesses 154, it should be appreciated that in alternative embodiments, one or more profile inserts may include one or more openings and/or recesses, and the driven shaft of the spindle may include corresponding protrusion(s) configured to engage the opening(s)/recess(es) of the profile insert(s) to substantially block rotation of the profile insert(s) relative to the spindle. Furthermore, in certain embodiments, the longitudinal extension/opening interface and/or the protrusion/recess interface may be omitted, and/or other locking element(s) suitable for non-rotatably coupling the profile inserts to the spindle (e.g., an adhesive connection, a latch mechanism, etc.) may be utilized. In certain embodiments, the profile inserts may not be coupled to one another. In such embodiments, each profile insert may be fixedly coupled to the spindle by a locking element (e.g., a pin, a latch, an adhesive connection, etc.).

In certain embodiments, the spindle may be formed by an injection molding process. Accordingly, the spindle may be formed from any material suitable for injection molding, such as a thermoplastic polymer. In addition, the profile inserts may be formed by a casting process. Accordingly, the profile inserts may be formed from any material suitable for casting, such as urethane. However, it should be appreciated that in alternative embodiments, the spindle and the profile inserts may be formed by any suitable process and from any suitable material. For example, in certain embodiments, the profile inserts may be overmolded onto the spindle, thereby forming a unitary meter roller.

In the illustrated embodiment, the profile inserts are the same as one another. Accordingly, the manufacturing costs associated with the meter roller may be reduced, as compared to a meter roller formed from location-specific profile inserts. In addition, the profile inserts of each rank may be particularly selected to meter a particular material at a particular rate. For example, profile inserts having a profile suitable for small particle size and low application rate may be utilized for the first rank, and profile inserts having a profile suitable for small particle size and high application rate may be utilized for the second rank. In certain embodiments, the metering system may include a slide configured to selectively cover the first or the second rank. In such embodiments, the slide may be positioned to expose the first rank a while lower application rate is desired and the second rank while a higher application rate is desired. Profile inserts having any suitable profile may be utilized for the first rank and for the second rank. Because the meter roller may be formed by selecting suitable profile inserts and coupling the selected profile inserts to the spindle, the manufacturing costs of the meter rollers may be significantly reduced, as compared to the costs associated with creating a large number of molds for a variety of respective meter roller configurations (e.g., in embodiments in which the meter rollers are formed by a molding process).

In the illustrated embodiment, the sealing ring 136 is configured to be longitudinally disposed between the third ring 128 and the fourth ring 130 of the spindle 120. The sealing ring 136 is also configured to extend about the entire circumference of the spindle. As previously discussed, the sealing ring 136 is configured to block the flowable particulate material from entering the interior of the spindle 120. In the illustrated embodiment, the sealing ring 136 includes six radial protrusions 156 configured to engage six corresponding engagement elements, such as the illustrated openings 158, in the spindle 120. Contact between circumferential surfaces of the radial protrusions 156 and corresponding circumferential surfaces of the openings 158 substantially blocks circumferential rotation of the sealing ring 136 (e.g., rotation about the longitudinal axis 106) relative to the spindle 120. In addition, contact between longitudinal surfaces of the sealing ring 136 and longitudinal surfaces of the rings substantially blocks longitudinal movement of the sealing ring 136 (e.g., movement along the longitudinal axis 106) relative to the spindle 120. Furthermore, the radial protrusions 156 and the openings 158 are angled to establish a mechanical lock between the sealing ring 136 and the spindle 120. However, in alternative embodiments, the radial protrusions/openings may be substantially straight or any other suitable shape. Furthermore, while the illustrated sealing ring 136 includes six radial protrusions 156, it should be appreciated that in alternative embodiments, the sealing ring may include more or fewer radial protrusions (e.g., 1, 2, 3, 4, 5, 6, 7, 8, or more), and the spindle may include a corresponding number of openings or recesses configured to engage the radial protrusions. Indeed, in certain embodiments, the radial protrusions may be omitted, and in such embodiments, the openings/recesses may also be omitted. In embodiments in which the radial protrusions are omitted, circumferential rotation of the sealing ring relative to the spindle may be substantially blocked by friction (e.g., between a radially inward surface of the sealing ring and a radially outward surface of the spindle, and/or between longitudinally outward surfaces of the sealing ring and longitudinally inward surfaces of the third and fourth rings). Alternatively, in embodiments in which the radial protrusions are omitted, circumferential rotation of the sealing ring relative to the spindle may be enabled.

In the illustrated embodiment, the sealing ring 136 is formed from a resilient material (e.g., polyurethane). Accordingly, the sealing ring 136 may be coupled to the spindle 120 by stretching the sealing ring and then disposing the sealing ring longitudinally between the third ring 128 and the fourth ring 130 of the spindle 120. Contraction of the sealing ring is then enabled such that the outer diameter of the sealing ring is less than or equal to the outer diameter of the third and fourth rings. As a result, the third and fourth rings block longitudinal movement of the sealing ring relative to the spindle. In addition, while the sealing ring is disposed on the spindle, the radial protrusions engage the corresponding openings, thereby blocking circumferential rotation of the sealing ring relative to the spindle.

In certain embodiments, the sealing ring may be coupled to the spindle (e.g., non-rotatably coupled to the spindle) by additional or alternative connection systems. For example, in certain embodiments, the sealing ring may be coupled to the spindle by an adhesive connection, by fasteners, by a latching system, or a combination thereof, among other suitable connections. Furthermore, while the sealing ring is a single annular element in the illustrated embodiment, it should be appreciated that in alternative embodiments, the sealing ring may be formed from multiple (e.g., substantially rigid) arcuate segments. Each segment may be coupled to the spindle by any suitable connection system, such as an adhesive connection or fasteners, among other suitable types of connections.

While the peripheral surface (e.g., outer circumferential surface) of the sealing ring is substantially smooth in the illustrated embodiment, it should be appreciated that in certain embodiments, the peripheral surface may include alternating flutes and recesses to form a third rank of the meter roller. For example, the first and second ranks may have profiles suitable for metering coarse particulate material at a high application rate, and the sealing ring may have a profile suitable for metering fine particulate material at a low application rate. Accordingly, in embodiments including a slide positioned over the meter roller, the slide may be positioned to expose the rank(s) suitable for metering the selected flowable particulate material. Furthermore, while the illustrated spindle is configured to establish two or three ranks (e.g., depending on whether the sealing ring includes a profile), it should be appreciated that in alternative embodiments, the spindle may be configured to establish more or fewer ranks (e.g., 1, 2, 3, 4, 5, 6, or more).

Figure 10:
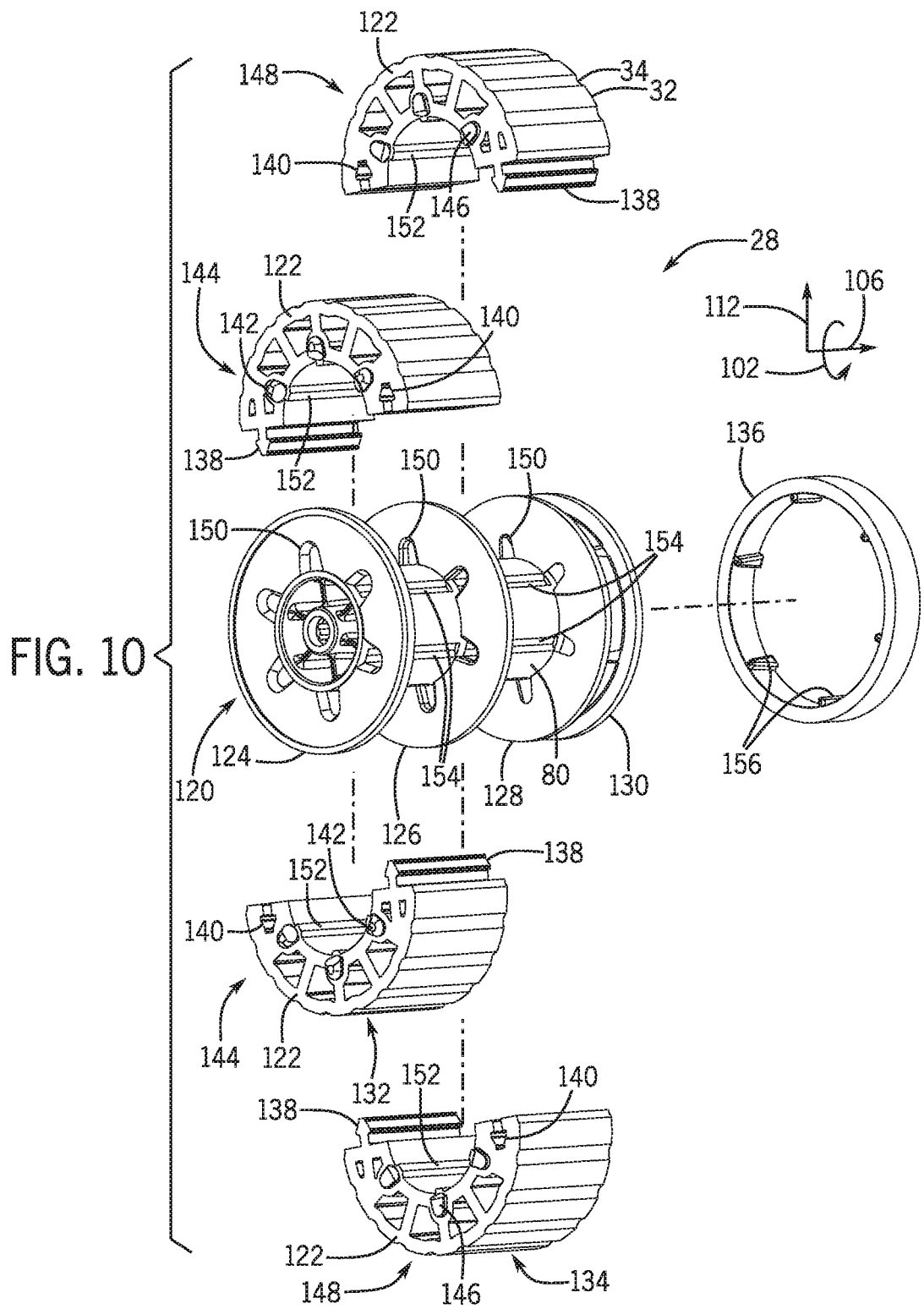
FIG. 10 is an exploded front perspective view of the meter roller of FIG. 7.

FIG. 10 is an exploded front perspective view of the meter roller 28 of FIG. 7. As illustrated, each profile insert 122 of the first rank 132 includes three profiled longitudinal extensions 142 on the longitudinally outward side 144 of the profile insert 122. In addition, each profile insert 122 of the second rank 134 includes three substantially flat longitudinal extensions 146 on the longitudinally inward side 148 of the profile insert 122. As previously discussed, the profiled longitudinal extensions 142 on the profile inserts 122 of the first rank 132 are configured to engage the openings 150 in the first ring 124, and the profiled longitudinal extensions on the profile inserts 122 of the second rank 134 are configured to engage the openings 150 in the third ring 128. Furthermore, the substantially flat longitudinal extensions on the profile inserts 122 of the first rank 132 are configured to engage the openings 150 in the second ring 126, and the substantially flat longitudinal extensions 146 on the profile inserts 122 of the second rank 134 are configured to engage the openings 150 in the second ring 126. Engagement of the longitudinal extensions 142 and 146 with the corresponding openings 150 substantially blocks rotation of the profile inserts 122 relative to the spindle 120 about the longitudinal axis 106.

As previously discussed, the sealing ring 136 includes six radial protrusions 156 configured to engage six corresponding openings 158 in the spindle 120. Contact between circumferential surfaces of the radial protrusions 156 and corresponding circumferential surfaces of the openings 158 substantially blocks circumferential rotation of the sealing ring 136 (e.g., rotation along the circumferential axis 102) relative to the spindle 120. In addition, contact between longitudinal surfaces of the sealing ring 136 and longitudinal surfaces of the rings substantially blocks longitudinal movement of the sealing ring 136 (e.g., movement along the longitudinal axis 106) relative to the spindle 120. In addition, the radial protrusions 156 and the openings 158 are angled to establish a mechanical lock between the sealing ring 136 and the spindle 120.

Figure 11:
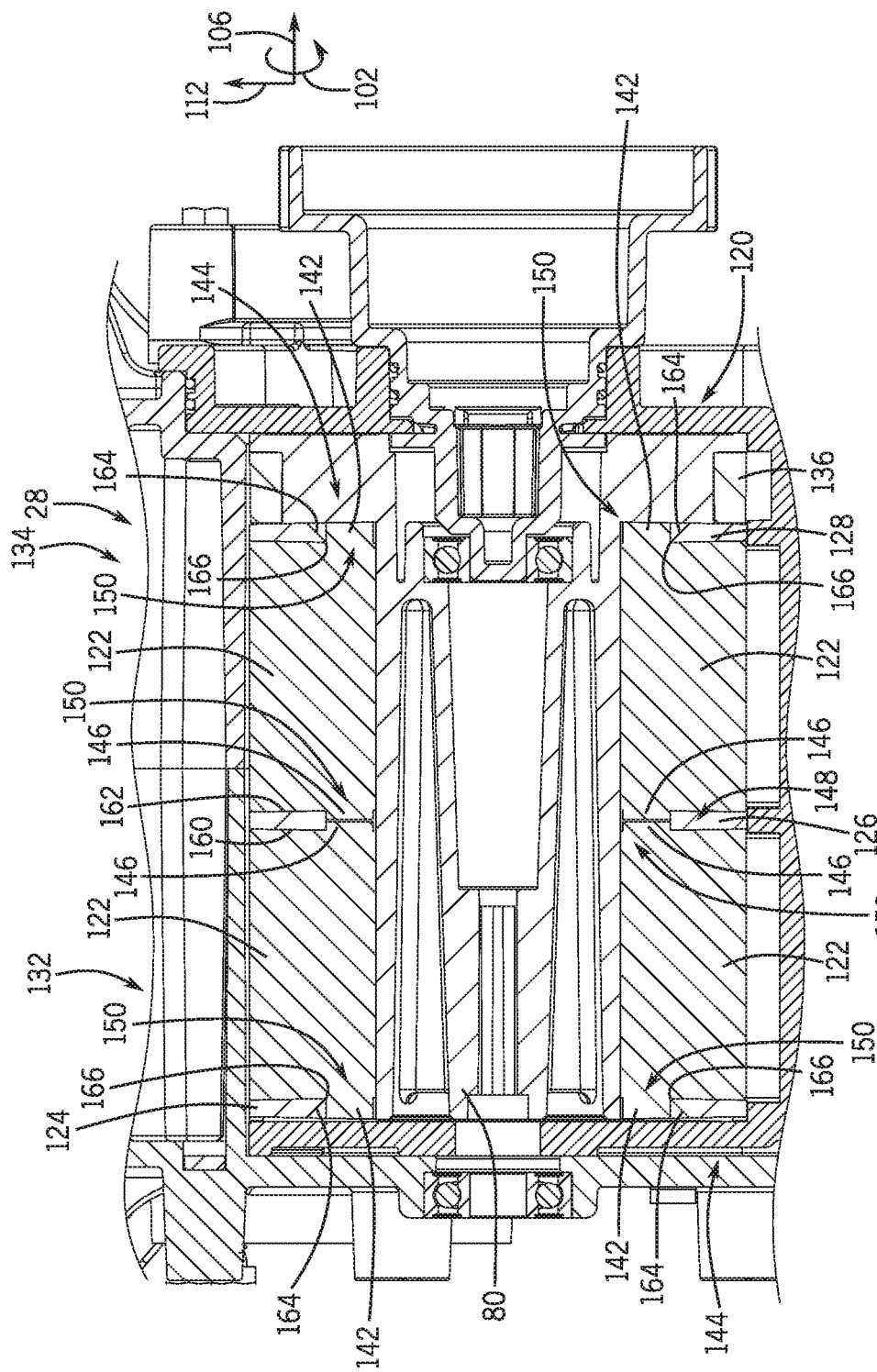
FIG. 11 is a cross-sectional view of the meter roller of FIG. 7, taken along line 11-11 of FIG. 7.

FIG. 11 is a cross-sectional view of the meter roller 28 of FIG. 7, taken along line 11-11 of FIG. 7. As illustrated, the profile inserts 122 and the sealing ring 136 are engaged with the spindle 120, thereby forming the meter roller 28. As illustrated, the profiled longitudinal extensions 142 on the profile inserts 122 of the first rank 132 are engaged with the openings 150 in the first ring 124, and the profiled longitudinal extensions 142 on the profile inserts 122 of the second rank 134 are engaged with the openings 150 of the third ring 128. Furthermore, the substantially flat longitudinal extensions 146 on the profile inserts 122 of the first rank 132 are engaged with the openings 150 in the second ring 126, and the substantially flat longitudinal extensions 146 on the profile inserts 122 of the second rank 134 are engaged with the openings 150 in the second ring 126. Engagement of the longitudinal extensions 142 and 146 with the corresponding openings 150 substantially blocks rotation of the profile inserts 122 relative to the spindle 120 about the longitudinal axis 106.

In the illustrated embodiment, the laterally inward side 148 of each profile insert 122 of the first rank 132 is configured to contact a first surface 160 of the second ring 126 of the spindle 120. In addition, the laterally inward side 148 of each profile insert 122 of the second rank 134 is configured to contact a second surface 162 of the second ring 126 of the spindle 120, longitudinally opposite the first surface 160. Because the profile inserts contact the second ring on opposite longitudinal surfaces, the profile inserts may support the second ring, thereby increasing the longevity of the meter roller.

In the illustrated embodiment, the radially outward surfaces 164 of the openings 150 in the first ring 124 and the third ring 128 of the spindle 120 are angled, thereby forming respective points 166 at the longitudinally inward ends of the openings 150. The points 166 are configured to engaged the profiled longitudinal extensions 142, thereby blocking outward movement of the profile inserts 122 along the radial axis 112. As a result, the profile inserts 122 are substantially fixedly coupled to the spindle 120. While the radially outward surfaces of the openings in the first and third rings are angled in the illustrated embodiments, it should be appreciated that in alternative embodiments the radially outward surfaces may have other suitable shapes, such as substantially flat or curved, among other suitable shapes. In addition, in certain embodiments, the profiled longitudinal extensions may be omitted, and in such embodiments, the openings in the first and third rings may be omitted.

Figure 12:
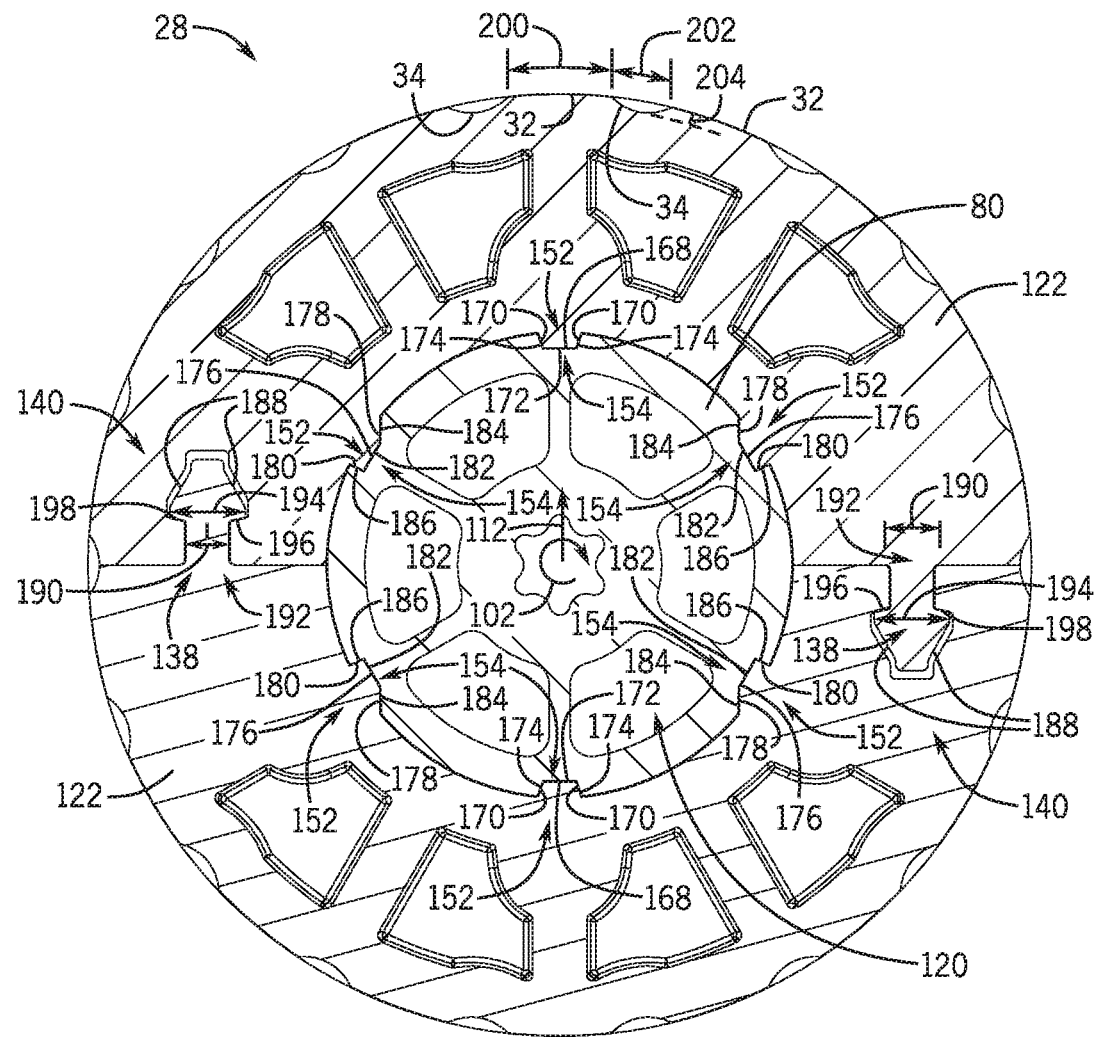
FIG. 12 is a cross-sectional view of the meter roller of FIG. 7, taken along line 12-12 of FIG. 7.

FIG. 12 is a cross-sectional view of the meter roller 28 of FIG. 7, taken along line 12-12 of FIG. 7. As illustrated, the protrusions 152 of the profile inserts 122 are engaged with the recesses 154 of the driven shaft 80 of the spindle 120. As previously discussed, engagement of the protrusions 152 and the recesses 154 substantially blocks rotation of the profile inserts 122 relative to the spindle 120. In the illustrated embodiment, each profile insert 122 includes a first protrusion 168 having angled circumferential sides 170. In addition, the driven shaft 80 of the spindle 120 includes corresponding first recesses 172 having angled circumferential sides 174. The angle of each circumferential side 170 of each first protrusion 168 (e.g., relative to the radial axis 112) is substantially equal to the angle of each respective circumferential side 174 of each first recess 172, thereby facilitating contact between the respective sides. The angle of each side may be particularly selected to facilitate injection molding of the spindle and/or to facilitate insertion of the protrusion into the respective recess.

Furthermore, each profile insert 122 includes two second protrusions 176 each having an angled circumferential side 178 and a substantially flat circumferential side 180. As illustrated, the angled circumferential side 178 faces toward the first protrusion 168, and the substantially flat circumferential side 180 faces away from the first protrusion 168. The driven shaft 80 of the spindle 120 includes corresponding second recesses 182 having an angled circumferential side 184 and a substantially flat circumferential side 186. The angle of the angled circumferential side 178 of each second protrusion 176 (e.g., relative to the radial axis 112) is substantially equal to the angle of the angled circumferential side 184 of each second recess 182, thereby facilitating contact between the respective angled circumferential sides. The angle of each angled side may be particularly selected to facilitate injection molding of the spindle and/or to facilitate insertion of the protrusion into the respective recess.

While each protrusion and each recess includes an angled circumferential side in the illustrated embodiment, it should be appreciated that in alternative embodiments, each protrusion and each corresponding recess may have another suitable shape that facilitates manufacturing of the spindle and/or the profile inserts, and/or facilitates insertion of the protrusions into the respective recesses. Furthermore, in certain embodiments, the protrusions may be substantially the same shape as one another, and the corresponding recesses may be substantially the same shape as one another, thereby enabling each profile insert to be installed on the spindle at any suitable circumferential position. In addition, while each profile insert includes three protrusions in the illustrated embodiment, it should be appreciated that in alternative embodiments, each profile insert may include more or fewer protrusions (e.g., 0, 1, 2, 3, 4, 5, 6, or more), and the spindle may include a corresponding number of recesses (e.g., for each of the attached inserts). Furthermore, while the illustrated embodiment includes protrusion and recesses, it should be appreciated that in alternative embodiments, the spindle and the profile inserts may include other locking element(s) (e.g., an adhesive connection, a latch system, etc.) to non-rotatably couple the profile inserts to the spindle.

As illustrated, the protrusion 138 of each profile insert 122 is engaged with a corresponding recess 140 of the other profile insert 122, thereby coupling the profile inserts to one another. In the illustrated embodiment, each protrusion 138 includes angled surface 188 configured to facilitate insertion of the protrusion 138 into the respective recess 140. As illustrated, a width 190 of an opening 192 to the recess 140 is less than a maximum width 194 of the protrusion 138. Accordingly, during insertion of the protrusion 138 into the recess 140, contact between the walls of the opening 192 and the angled surfaces 188 compresses the protrusion and/or expands the opening, thereby enabling the protrusion to engage the recess. Once the protrusion 138 is engaged with the recess 140, movement of the protrusion 138 away from the recess 140 is blocked by contact between blocking surfaces 196 that form a portion of the recess 140 and corresponding surfaces 198 of the protrusion 138. Accordingly, while the protrusions 138 are engaged with the recesses 140, the respective profile inserts 122 are coupled to one another.

While each protrusion 138 includes angled surfaces in the illustrated embodiment, it should be appreciated that the protrusion may have other suitable shapes in alternative embodiments. Furthermore, while the illustrated profile inserts are coupled to one another by the interlocked protrusions/recesses in the illustrated embodiment, it should be appreciated that in alternative embodiments, the profile inserts may be coupled to one another by other suitable coupling systems, such as magnet(s), hook and loop fastener(s), or an adhesive connection, among other suitable coupling systems. In further embodiments, the coupling elements may be omitted and each profile insert may be fixedly coupled to the spindle.

As previously discussed, the meter roller 28 includes multiple flutes 32 and recesses 34 arranged in an alternating pattern along the circumferential axis 102 of the meter roller 28. The flutes and recesses are configured to meter the flowable particulate material from a storage tank to a material distribution system via rotation of the meter roller. In the illustrated embodiment, a circumferential extent 200 of each flute 32 is greater than a circumferential extent 202 of each recess 34 along an entire longitudinal extent of the flute and the recess. In certain embodiments, a ratio of the circumferential extent 200 of each flute 32 to the circumferential extent 202 of each recess 34 may be about 100 to about 300 percent, about 120 to about 250 percent, about 135 to about 200 percent, or about 150 percent. Furthermore, in certain embodiments, the ratio of the circumferential extent 200 of each flute 32 to the circumferential extent 202 of each recess 34 may be at least 100 percent, at least 125 percent, at least 150 percent, at least 175 percent, at least 200 percent, at least 250 percent, or at least 300 percent. Accordingly, in certain embodiments, the circumferential extent 200 of each flute 32 is at least 1.5 times greater than the circumferential extent 202 of each recess 34 (e.g., ratio of at least 150 percent) along an entire longitudinal extent of the flute and the recess. Utilizing flutes with a larger circumferential extent relative to the circumferential extent of the recesses may substantially reduce the amount of flowable particulate material that bypasses the meter roller during operation of the metering system, thereby increasing the accuracy of the metering process.

In the illustrated embodiment, each recess 34 has an arcuate concave cross-section. However, it should be appreciated that in alternative embodiments, each recess may have another shape suitable for receiving flowable particulate material (e.g., a polygonal cross-section, etc.). In addition, each flute 32 has an arcuate convex cross-section. However, it should be appreciated that in alternative embodiments, each flute may have another shape suitable for blocking the flow of particulate material around the meter roller (e.g., a polygonal cross-section, etc.). Furthermore, a depth 204 of each recess 34 (e.g., extent of the recess along the radial axis 112) may be particularly selected to meter the flowable particulate material at a target rate.

While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute. For example, in certain embodiments, the circumferential extent of one flute may be at least 1.5 times greater than the circumferential extent of an adjacent recess, and the circumferential extent of another flute may be less than 1.5 times greater than the circumferential extent of an adjacent recess.

Figure 13:
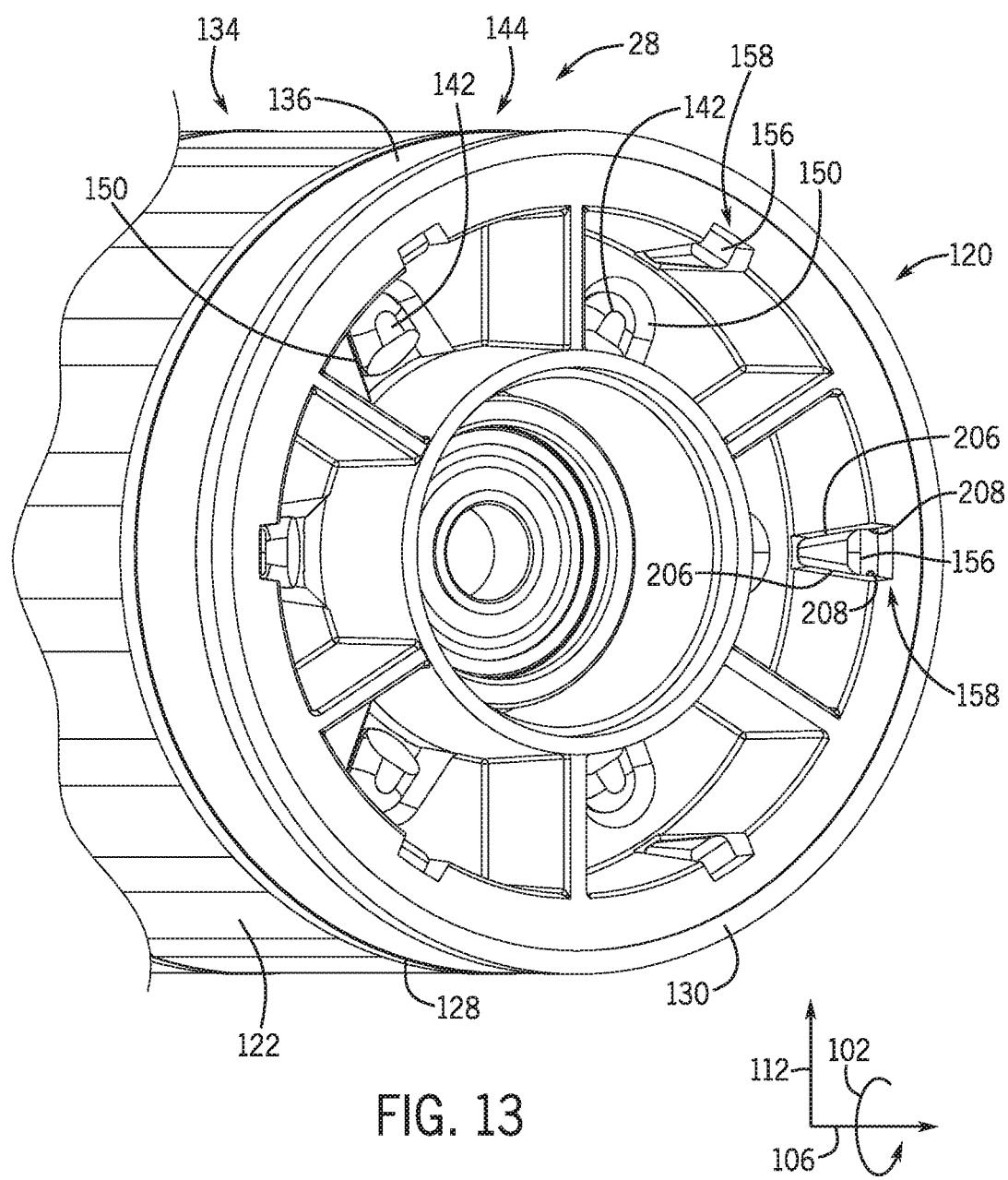
FIG. 13 is a perspective view of a portion of the meter roller of FIG. 7.

FIG. 13 is a perspective view of a portion of the meter roller 28 of FIG. 7. As illustrated, the radial protrusions 156 of the sealing ring 136 are engaged with the corresponding openings 158 in the spindle 120. Contact between circumferential surfaces 206 of the radial protrusions 156 and corresponding circumferential surfaces 208 of the openings 158 substantially blocks circumferential rotation of the sealing ring 136 (e.g., rotation about the longitudinal axis 106) relative to the spindle 120. In addition, the radial protrusions 156 and the openings 158 are angled to establish a mechanical lock between the sealing ring 136 and the spindle 120. However, in alternative embodiments, the radial protrusions/openings may be substantially straight or any other suitable shape. In addition, in certain embodiments, the radial protrusions may be configured to interlock with the corresponding openings to block radially movement (e.g., movement along the radial axis 112) of the sealing ring relative to the spindle. Furthermore, as illustrated, the profiled longitudinal extensions 142 on the longitudinally outward side 144 of the profile inserts 122 of the second rank 134 are engaged with the openings 150 in the third ring 128. As previously discussed, engagement of the longitudinal extensions 142 with the corresponding openings 150 substantially blocks rotation of the profile inserts 122 relative to the spindle 120 about the longitudinal axis 106.

Figure 14:
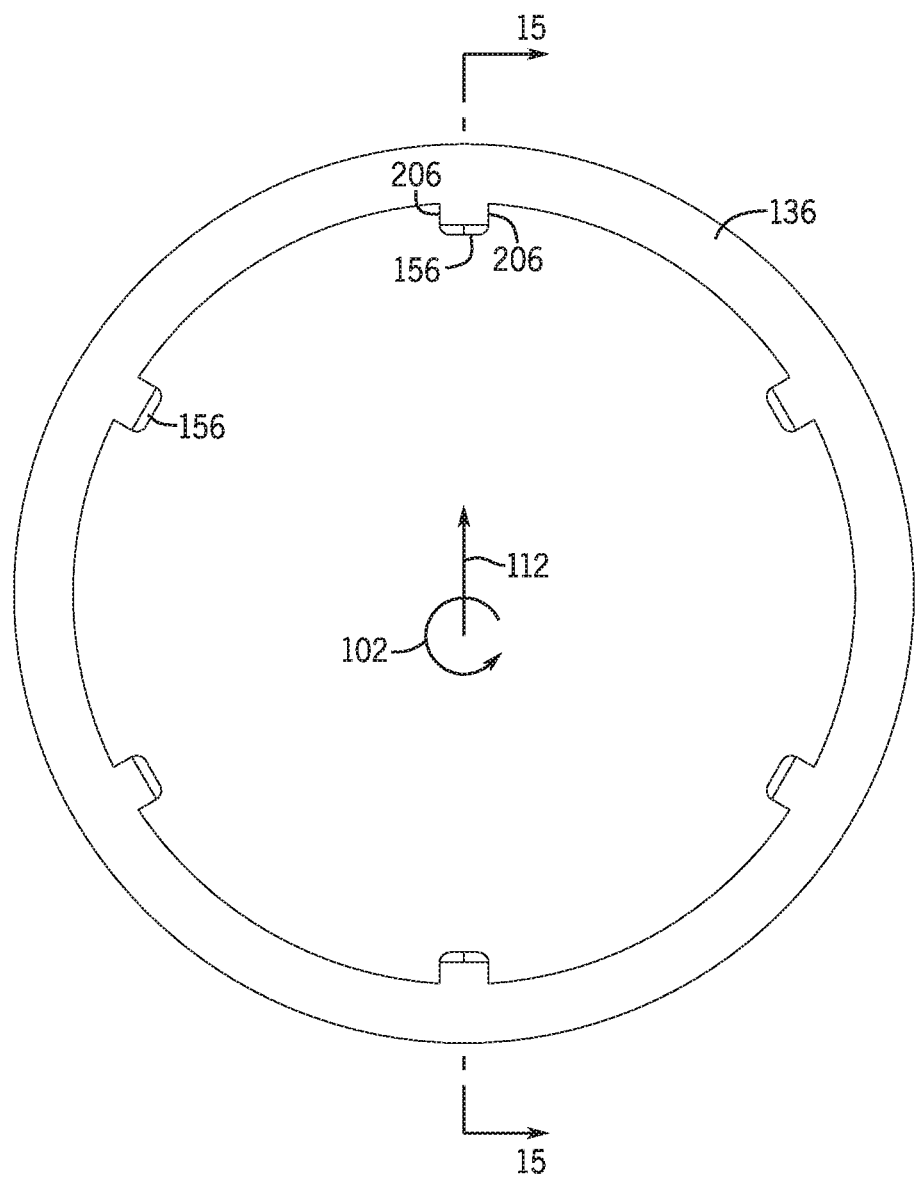
FIG. 14 is a back view of the sealing ring of FIG. 9.

FIG. 14 is a back view of the sealing ring 136 of FIG. 9. As illustrated, the sealing ring 136 includes six radial protrusions 156, each extending inwardly along the radial axis 112. In the illustrated embodiment, the radial protrusions 156 are substantially equally spaced apart from one another along the circumferential axis 102. However, it should be appreciated that in alternative embodiments, the radial protrusions may be positioned in any suitable location along the inner surface of the sealing ring 136. Furthermore, while the illustrated sealing ring 136 includes six radial protrusions 156, it should be appreciated that in alternative embodiments, the sealing ring may include more or fewer radial protrusions (e.g., 0, 1, 2, 3, 4, 5, 6, 7, 8, or more).

Figure 15:
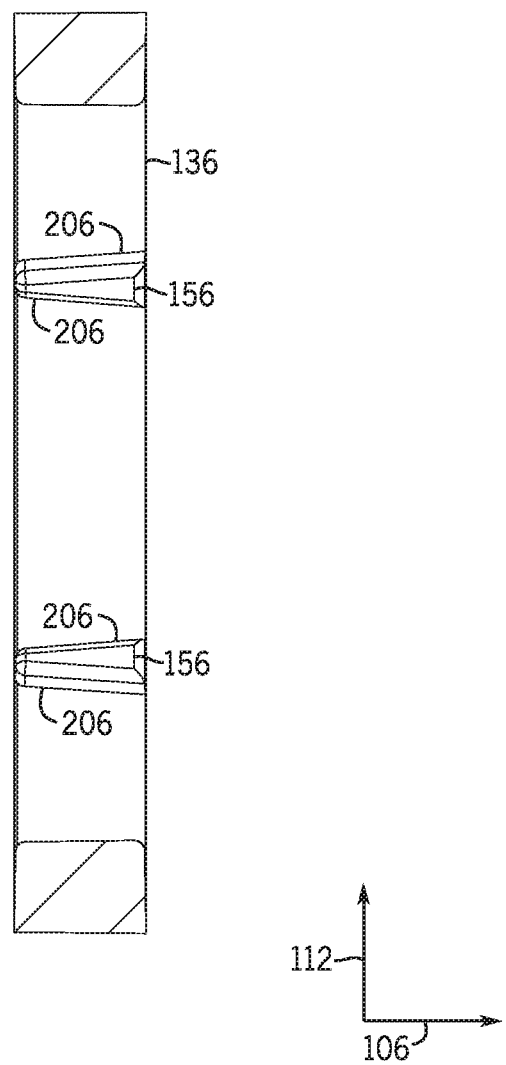
FIG. 15 is a cross-sectional view of the sealing ring of FIG. 9, taken along line 15-15 of FIG. 14.

FIG. 15 is a cross-sectional view of the sealing ring 136 of FIG. 9, taken along line 15-15 of FIG. 14. As illustrated, each radial protrusion 156 includes an angled surface 206 that tapers along the longitudinal axis 106. In addition, the angled surfaces 206 taper along the radial axis 112. The angles of the angled surfaces may be particularly selected to facilitate installation of the sealing ring 136 on the spindle and to establish a mechanical lock between the sealing ring and the spindle.

Figure 16:
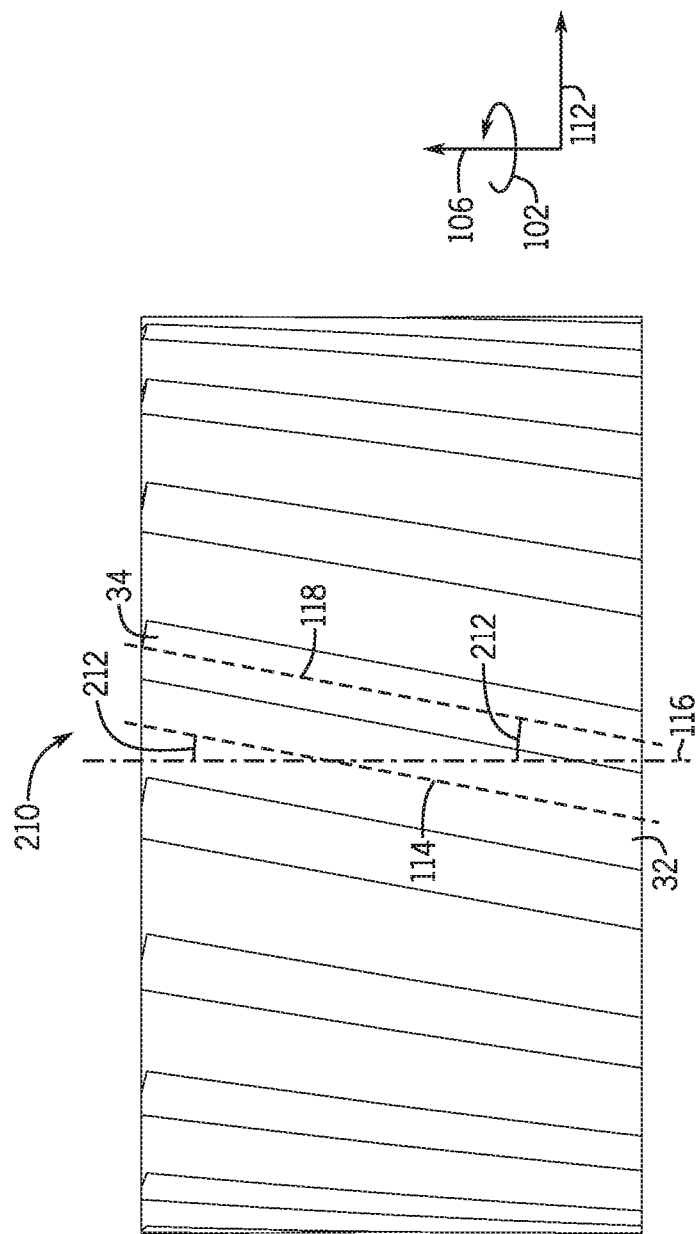
FIG. 16 is a top view of an embodiment of a profile insert that may be used on the meter roller of FIG. 7.

FIG. 16 is a top view of an embodiment of a profile insert 210 that may be used on the meter roller of FIG. 7. As previously discussed, a profile insert suitable for a particular flowable particulate material and/or distribution rate may be coupled to the spindle to establish a desired meter roller profile. In the illustrated embodiment, the longitudinal axis 114 of each flute 32 and the longitudinal axis 118 of each recess 34 are orientated at an angle 212 relative to the rotational axis 116 of the meter roller/profile insert. In certain embodiments, the angle 212 may be between about 1 degree and about 45 degrees, about 2 degrees and about 30 degrees, about 5 degrees and about 15 degrees, or about 5 degrees and about 10 degrees. Furthermore, in certain embodiments, the angle may be at least 1 degree, at least 2 degrees, at least 5 degrees, at least 10 degrees, or at least 15 degrees. The angle may be selected to enhance the uniformity of distribution of the flowable particulate material from the profile inserts. While the angles of the flutes and the recesses are substantially equal to one another in the illustrated embodiment, it should be appreciated that in alternative embodiments, the profile insert may include flutes and/or recesses oriented at different angles.

Figure 17:
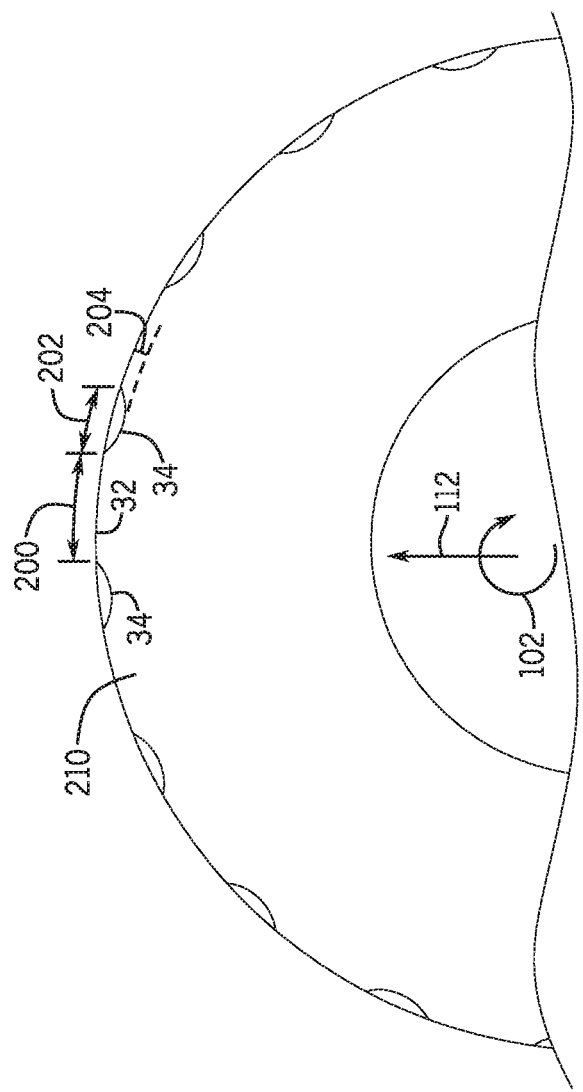
FIG. 17 is a front view of the profile insert of FIG. 16.

FIG. 17 is a front view of the profile insert 210 of FIG. 16. In the illustrated embodiment, the circumferential extent 200 of each flute 32 is greater than the circumferential extent 202 of each recess 34 along the entire longitudinal extent of the flute and the recess. In certain embodiments, a ratio of the circumferential extent 200 of each flute 32 to the circumferential extent 202 of each recess 34 may be about 100 to about 300 percent, about 120 to about 250 percent, about 135 to about 200 percent, or about 150 percent. Furthermore, in certain embodiments, the ratio of the circumferential extent 200 of each flute 32 to the circumferential extent 202 of each recess 34 may be at least 100 percent, at least 125 percent, at least 150 percent, at least 175 percent, at least 200 percent, at least 250 percent, or at least 300 percent. Accordingly, in certain embodiments, the circumferential extent 200 of each flute 32 is at least 1.5 times greater than the circumferential extent 202 of each recess 34 (e.g., ratio of at least 150 percent) along an entire longitudinal extent of the flute and the recess. Utilizing flutes with a larger circumferential extent relative to the circumferential extent of the recesses may substantially reduce the amount of flowable particulate material that bypasses the meter roller during operation of the metering system, thereby increasing the accuracy of the metering process.

In the illustrated embodiment, each recess 34 has an arcuate concave cross-section. However, it should be appreciated that in alternative embodiments, each recess may have another shape suitable for receiving flowable particulate material (e.g., a polygonal cross-section, etc.). In addition, each flute 32 has an arcuate convex cross-section. However, it should be appreciated that in alternative embodiments, each flute may have another shape suitable for blocking the flow of particulate material around the meter roller (e.g., a polygonal cross-section, etc.). Furthermore, a depth 204 of each recess 34 (e.g., extent of the recess along the radial axis 112) may be particularly selected to meter the flowable particulate material at a target rate.

While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute. For example, in certain embodiments, the circumferential extent of one flute may be at least 1.5 times greater than the circumferential extent of an adjacent recess, and the circumferential extent of another flute may be less than 1.5 times greater than the circumferential extent of an adjacent recess.

Figure 18:
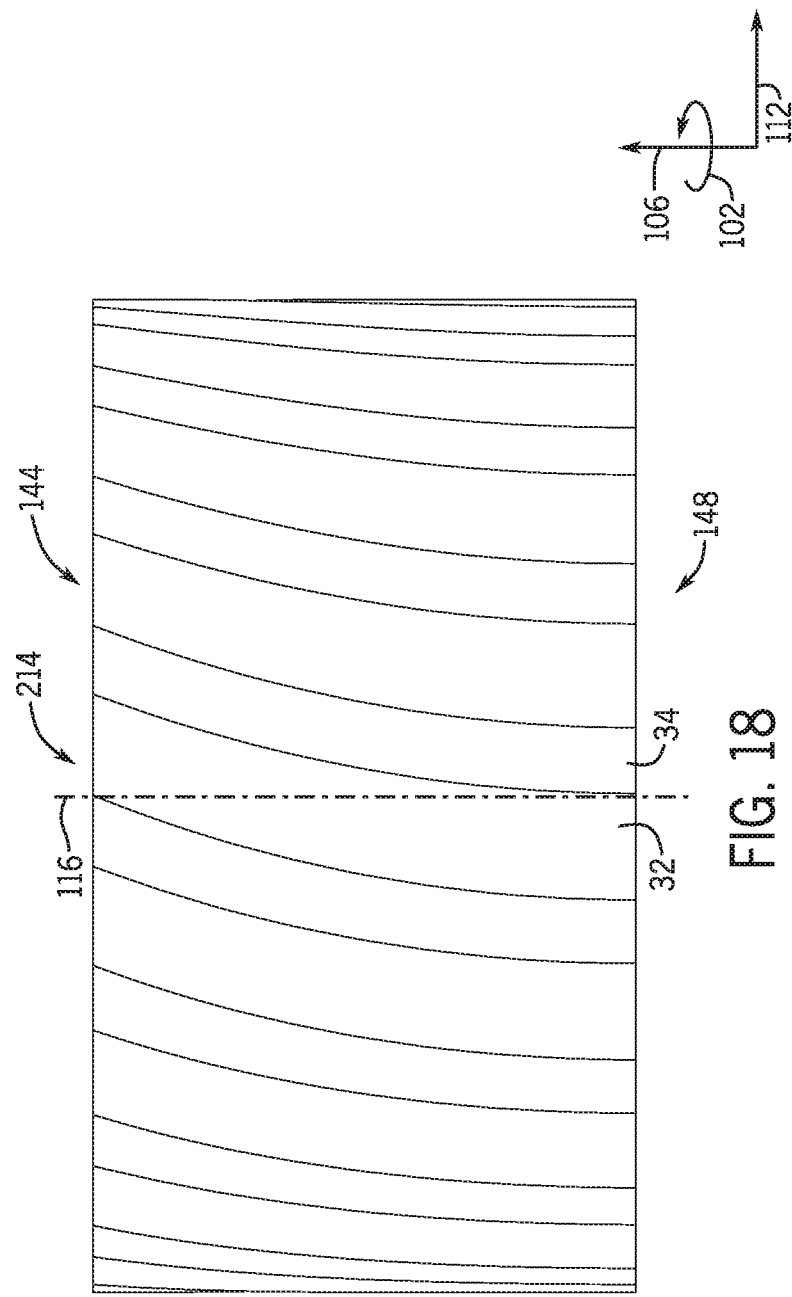
FIG. 18 is a top view of another embodiment of a profile insert that may be used on the meter roller of FIG. 7.

FIG. 18 is a top view of another embodiment of a profile insert 214 that may be used on the meter roller of FIG. 7. In the illustrated embodiment, each flute 32 extends along a curved path between a first longitudinal end of the flute (e.g., at the longitudinally outward side 144 of the profile insert 214) and a second longitudinal end of the flute (e.g., at the longitudinally inward side 148 of the profile insert 214). In addition, each recess 34 extends along a curved path between a first longitudinal end of the recess (e.g., at the longitudinally outward side 144 of the profile insert 214) and a second longitudinal end of the recess (e.g., at the longitudinally inward side 148 of the profile insert 214). While the path of each flute and recess is continuously curved between the longitudinally outward side and the longitudinally inward side of the profile insert, it should be appreciated that in alternative embodiments, the path may include one or more substantially straight (e.g., angled) portions. In addition, the degree of curvature of each flute and/or each recess may vary along the path. Indeed, the path of each flute and each recess may be selected to enhance the uniformity of distribution of the flowable particulate material from the profile insert. While the flutes and the recesses follow substantially the same curved paths in the illustrated embodiment, it should be appreciated that in alternative embodiments, the profile insert may include flutes and/or recesses that follow different paths between the longitudinally outward side and the longitudinally inward side of the profile insert.

Figure 19:
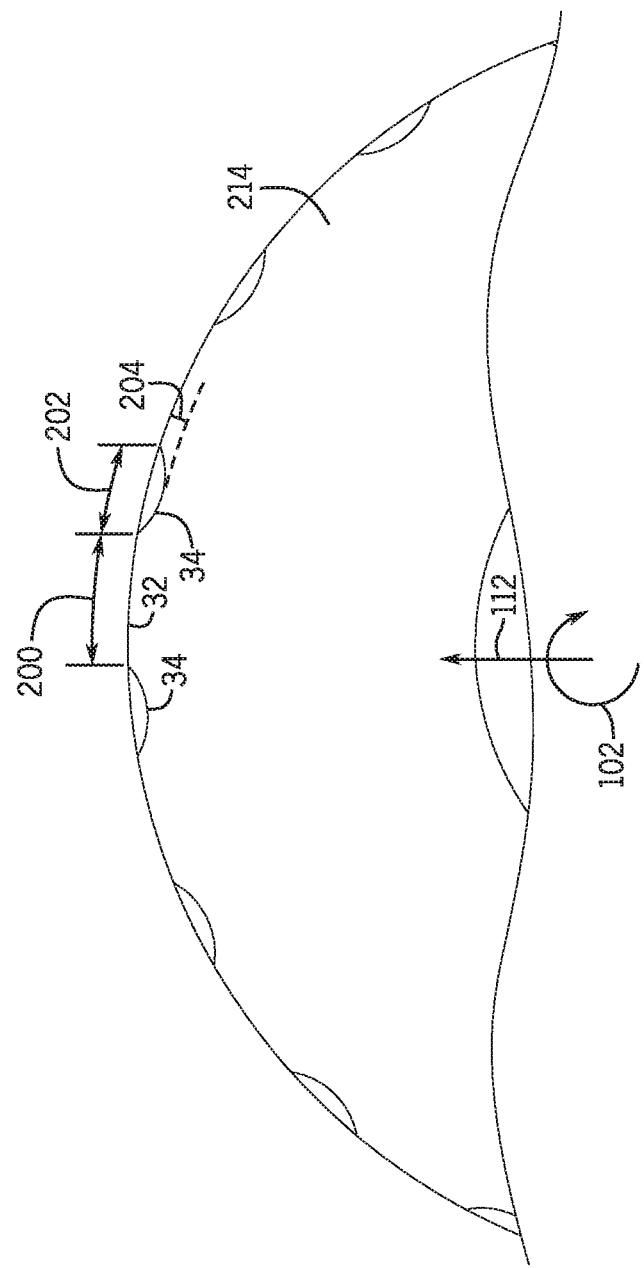
FIG. 19 is a front view of the profile insert of FIG. 18.

FIG. 19 is a front view of the profile insert 214 of FIG. 18. In the illustrated embodiment, the circumferential extent 200 of each flute 32 is greater than the circumferential extent 202 of each recess 34 along the entire longitudinal extent of the flute and the recess. In certain embodiments, a ratio of the circumferential extent 200 of each flute 32 to the circumferential extent 202 of each recess 34 may be about 100 to about 300 percent, about 120 to about 250 percent, about 135 to about 200 percent, or about 150 percent. Furthermore, in certain embodiments, the ratio of the circumferential extent 200 of each flute 32 to the circumferential extent 202 of each recess 34 may be at least 100 percent, at least 125 percent, at least 150 percent, at least 175 percent, at least 200 percent, at least 250 percent, or at least 300 percent. Accordingly, in certain embodiments, the circumferential extent 200 of each flute 32 is at least 1.5 times greater than the circumferential extent 202 of each recess 34 (e.g., ratio of at least 150 percent) along an entire longitudinal extent of the flute and the recess. Utilizing flutes with a larger circumferential extent relative to the circumferential extent of the recesses may substantially reduce the amount of flowable particulate material that bypasses the meter roller during operation of the metering system, thereby increasing the accuracy of the metering process.

In the illustrated embodiment, each recess 34 has an arcuate concave cross-section. However, it should be appreciated that in alternative embodiments, each recess may have another shape suitable for receiving flowable particulate material (e.g., a polygonal cross-section, etc.). In addition, each flute 32 has an arcuate convex cross-section. However, it should be appreciated that in alternative embodiments, each flute may have another shape suitable for blocking the flow of particulate material around the meter roller (e.g., a polygonal cross-section, etc.). Furthermore, a depth 204 of each recess 34 (e.g., extent of the recess along the radial axis 112) may be particularly selected to meter the flowable particulate material at a target rate.

While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute. For example, in certain embodiments, the circumferential extent of one flute may be at least 1.5 times greater than the circumferential extent of an adjacent recess, and the circumferential extent of another flute may be less than 1.5 times greater than the circumferential extent of an adjacent recess.

Figure 20:
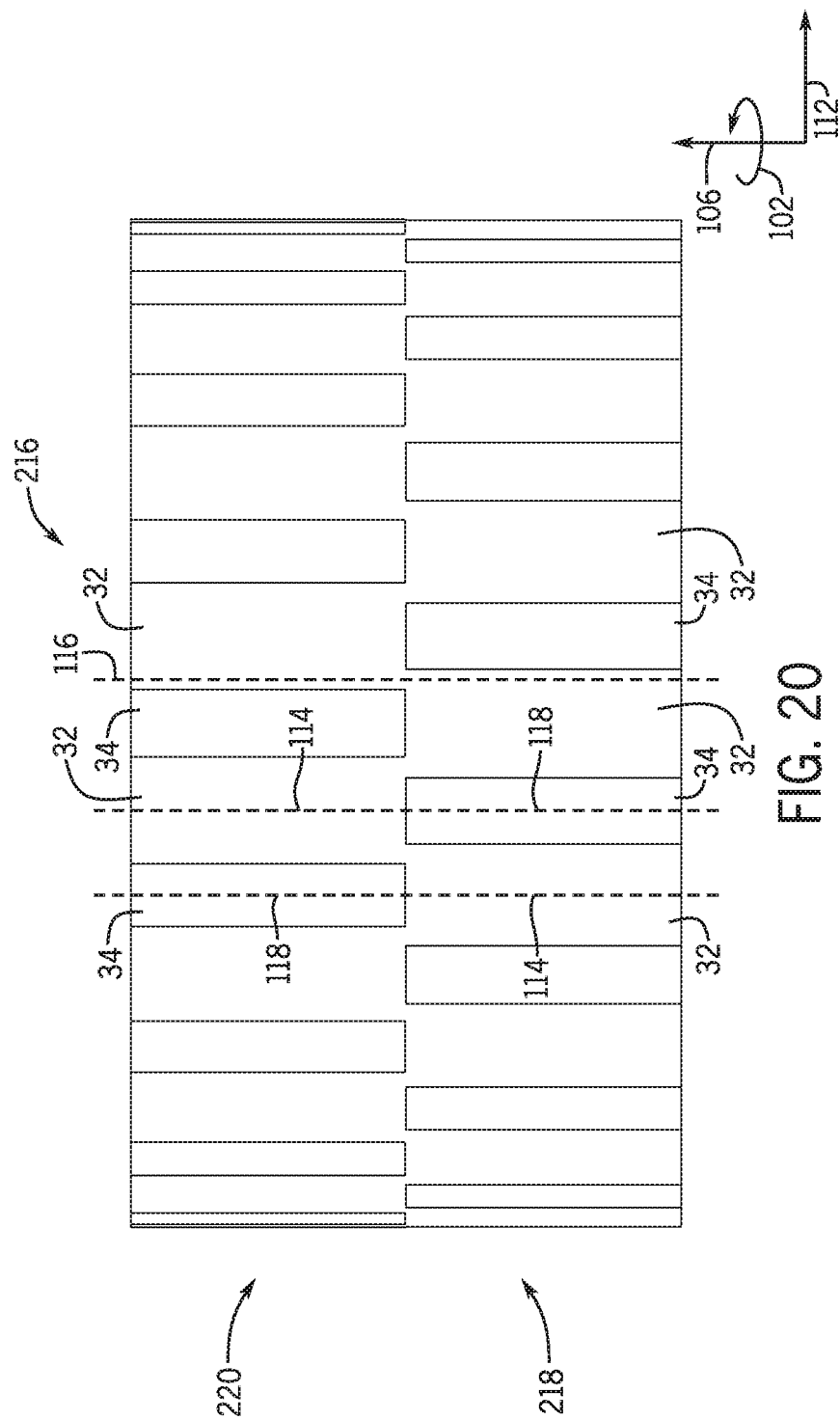
FIG. 20 is a top view of a further embodiment of a profile insert that may be used on the meter roller of FIG. 7.

FIG. 20 is a top view of a further embodiment of a profile insert 216 that may be used on the meter roller of FIG. 7. In the illustrated embodiment, the profile insert 216 includes a first row 218 of flutes 32 and recesses 34, and a second row 220 of flutes 32 and recesses 34. As illustrated, the flutes 32 and the recesses 34 of the first row 218 are arranged in an alternating pattern along the circumferential axis 102 of the profile insert 216. The flutes 32 and the recesses 34 of the first row 218 are configured to meter the flowable particulate material from the storage tank to the material distribution system via rotation of the profile insert 216. In addition, the flutes 32 and the recesses 34 of the second row 220 are arranged in an alternating pattern along the circumferential axis 102 of the profile insert 216. The flutes 32 and the recesses 34 of the second row 220 are configured to meter the flowable particulate material from the storage tank to the material distribution system via rotation of the profile insert 216. As illustrated, the flutes 32 and the recesses 34 of the second row 220 are longitudinally offset (e.g., offset along the longitudinal axis 106) from the flutes 32 and the recesses 34 of the first row 218. In addition, the flutes 32 and the recesses 34 of the second row 220 are circumferentially offset (e.g., offset along the circumferential axis 102) from the flutes 32 and the recesses 34 of the first row 218.

In the illustrated embodiment, the longitudinal axis 114 of each flute 32 of the first row 218 is substantially aligned with the longitudinal axis 118 of a corresponding recess 34 of the second row 220. In addition, the longitudinal axis 118 of each recess 34 of the first row 218 is substantially aligned with the longitudinal axis 114 of a corresponding flute 32 of the second row 220. However, it should be appreciated that in alternative embodiments, the longitudinal axes of the flutes and recesses of the two row may not be aligned with one another. For example, the second row may include more or fewer flutes and recesses than the first row, and/or the alternating pattern of flutes and recesses of the first row may be different than the alternating pattern of flutes and recesses of the second row (e.g., the circumferential extent of the flutes and/or recesses may vary between the rows). Furthermore, certain profile inserts may include a gap (e.g., ridge, recess, etc.) between the first row and the second row. In addition, while the illustrated profile insert includes two rows, it should be appreciated that in alternative embodiments, the profile insert may include more rows (e.g., 3, 4, 5, 6, or more). The arrangement of the flutes and recesses of each row and/or the number of rows may be selected to enhance the uniformity of distribution of the flowable particulate material from the profile insert. For example, at least one flute and/or at least one recess of at least one row may be angled relative to the rotational axis or may follow a curved path.

Figure 21:
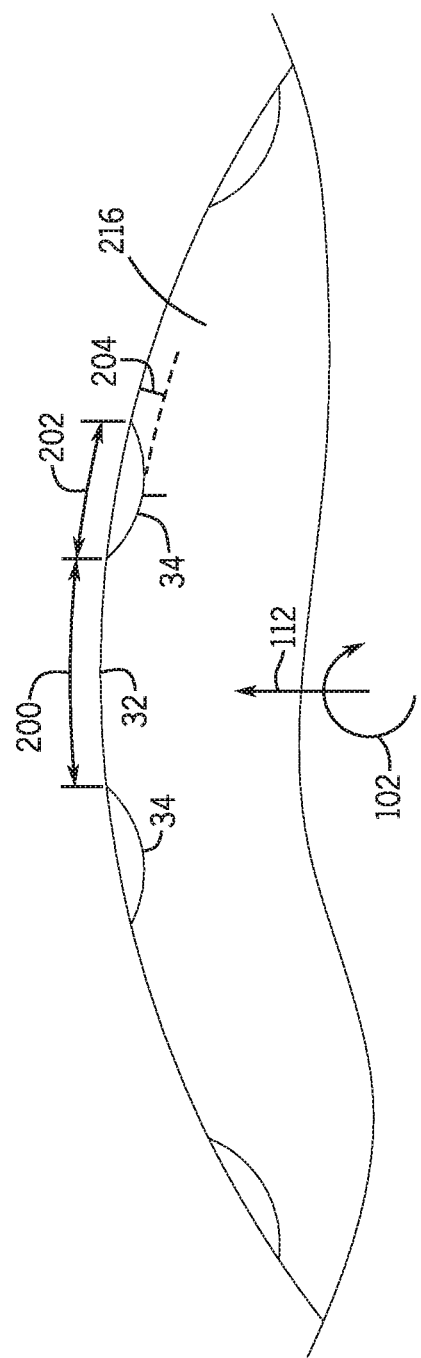
FIG. 21 is a front view of the profile insert of FIG. 20.

FIG. 21 is a front view of the profile insert 216 of FIG. 20. In the illustrated embodiment, the circumferential extent 200 of each flute 32 is greater than the circumferential extent 202 of each recess 34 along the entire longitudinal extent of the flute and the recess. In certain embodiments, a ratio of the circumferential extent 200 of each flute 32 to the circumferential extent 202 of each recess 34 may be about 100 to about 300 percent, about 120 to about 250 percent, about 135 to about 200 percent, or about 150 percent. Furthermore, in certain embodiments, the ratio of the circumferential extent 200 of each flute 32 to the circumferential extent 202 of each recess 34 may be at least 100 percent, at least 125 percent, at least 150 percent, at least 175 percent, at least 200 percent, at least 250 percent, or at least 300 percent. Accordingly, in certain embodiments, the circumferential extent 200 of each flute 32 is at least 1.5 times greater than the circumferential extent 202 of each recess 34 (e.g., ratio of at least 150 percent) along an entire longitudinal extent of the flute and the recess. Utilizing flutes with a larger circumferential extent relative to the circumferential extent of the recesses may substantially reduce the amount of flowable particulate material that bypasses the meter roller during operation of the metering system, thereby increasing the accuracy of the metering process.

In the illustrated embodiment, each recess 34 has an arcuate concave cross-section. However, it should be appreciated that in alternative embodiments, each recess may have another shape suitable for receiving flowable particulate material (e.g., a polygonal cross-section, etc.). In addition, each flute 32 has an arcuate convex cross-section. However, it should be appreciated that in alternative embodiments, each flute may have another shape suitable for blocking the flow of particulate material around the meter roller (e.g., a polygonal cross-section, etc.). Furthermore, a depth 204 of each recess 34 (e.g., extent of the recess along the radial axis 112) may be particularly selected to meter the flowable particulate material at a target rate.

While all of the recesses in the illustrated embodiment have substantially equal depths and circumferential extents, it should be appreciated that in alternative embodiments, the depth and/or circumferential extent of one recess may be different than the depth and/or circumferential extent of another recess. In addition, while all of the flutes in the illustrated embodiment have substantially equal circumferential extents, it should be appreciated that in alternative embodiments, the circumferential extent of one flute may be different than the circumferential extent of another flute. For example, in certain embodiments, the circumferential extent of one flute may be at least 1.5 times greater than the circumferential extent of an adjacent recess, and the circumferential extent of another flute may be less than 1.5 times greater than the circumferential extent of an adjacent recess. While the meter roller profiles (e.g., configurations of the flutes and recesses) are described above with reference to a profile insert, it should be appreciated that the meter roller profiles (e.g., the meter roller profiles described with reference to FIGS. 8, 12, and 16-21) may be utilized on other meter rollers, such as meter rollers formed from a single piece of material, meter rollers configured to operate without a cartridge, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A meter roller for an agricultural metering system, comprising:
a plurality of flutes and a corresponding plurality of recesses, wherein the plurality of flutes and the corresponding plurality of recesses are arranged in an alternating pattern along a circumferential axis of the meter roller, and the plurality of flutes and the corresponding plurality of recesses are configured to meter flowable particulate material from a storage tank to a material distribution system via rotation of the meter roller;
wherein a first circumferential extent of each flute of the plurality of flutes is at least 1.5 times greater than a second circumferential extent of each recess of the corresponding plurality of recesses along an entire longitudinal extent of the flute and the recess, and the entire longitudinal extent of the flute and the recess is greater than the first circumferential extent of the flute and the second circumferential extent of the recess.

2. The meter roller of claim 1, wherein a first longitudinal axis of each flute of the plurality of flutes and a second longitudinal axis of each recess of the corresponding plurality of recesses are substantially parallel to a rotational axis of the meter roller.

3. The meter roller of claim 1, wherein a first longitudinal axis of each flute of the plurality of flutes and a second longitudinal axis of each recess of the corresponding plurality of recesses are orientated at an angle relative to a rotational axis of the meter roller.

4. The meter roller of claim 3, wherein the angle is at least 2 degrees.

5. The meter roller of claim 1, wherein each flute of the plurality of flutes extends along a first curved path between a first longitudinal end of the flute and a second longitudinal end of the flute, and each recess of the corresponding plurality of recesses extends along a second curved path between a first longitudinal end of the recess and a second longitudinal end of the recess.

6. The meter roller of claim 1, comprising a second plurality of flutes and a corresponding second plurality of recesses, wherein the second plurality of flutes and the corresponding second plurality of recesses are arranged in an alternating pattern along the circumferential axis of the meter roller, and the second plurality of flutes and the corresponding second plurality of recesses are longitudinally and circumferentially offset from the plurality of flutes and the corresponding plurality of recesses.

7. The meter roller of claim 1, wherein each recess of the corresponding plurality of recesses has an arcuate concave cross-section.

8. The meter roller of claim 1, wherein each flute of the plurality of flutes has an arcuate convex cross-section.

9. A meter roller for an agricultural metering system, comprising:
a plurality of flutes and a corresponding plurality of recesses, wherein the plurality of flutes and the corresponding plurality of recesses are arranged in an alternating pattern along a circumferential axis of the meter roller, and the plurality of flutes and the corresponding plurality of recesses are configured to meter flowable particulate material from a storage tank to a material distribution system via rotation of the meter roller;
wherein a first circumferential extent of at least one flute of the plurality of flutes is at least 1.5 times greater than a second circumferential extent of at least one adjacent recess of the corresponding plurality of recesses along an entire longitudinal extent of the at least one flute and the at least one adjacent recess, and the entire longitudinal extent of the at least one flute and the at least one adjacent recess is greater than the first circumferential extent of the at least one flute and the second circumferential extent of the at least one adjacent recess.

10. The meter roller of claim 9, wherein a first longitudinal axis of the at least one flute and a second longitudinal axis of the at least one adjacent recess are substantially parallel to a rotational axis of the meter roller.

11. The meter roller of claim 9, wherein a first longitudinal axis of the at least one flute and a second longitudinal axis of the at least one adjacent recess are orientated at an angle relative to a rotational axis of the meter roller.

12. The meter roller of claim 11, wherein the angle is at least 2 degrees.

13. The meter roller of claim 9, wherein the at least one flute extends along a first curved path between a first longitudinal end of the at least one flute and a second longitudinal end of the at least one flute, and the at least one adjacent recess extends along a second curved path between a first longitudinal end of the at least one adjacent recess and a second longitudinal end of the at least one adjacent recess.

14. The meter roller of claim 9, comprising a second plurality of flutes and a corresponding second plurality of recesses, wherein the second plurality of flutes and the corresponding second plurality of recesses are arranged in an alternating pattern along the circumferential axis of the meter roller, and the second plurality of flutes and the corresponding second plurality of recesses are longitudinally and circumferentially offset from the plurality of flutes and the corresponding plurality of recesses.

15. The meter roller of claim 9, wherein the at least one adjacent recess has an arcuate concave cross-section.

16. The meter roller of claim 9, wherein the at least one flute has an arcuate convex cross-section.

* * * * *